US011570203B2

(12) United States Patent
Summers et al.

(10) Patent No.: US 11,570,203 B2
(45) Date of Patent: Jan. 31, 2023

(54) EDGE NETWORK-BASED ACCOUNT PROTECTION SERVICE

(71) Applicant: Akamai Technologies, Inc., Cambridge, MA (US)

(72) Inventors: John Summers, Cambridge, MA (US); Robert Polansky, Cambridge, MA (US); Darryl Nicholson, Portland, OR (US); Scott Markwell, Beaverton, OR (US)

(73) Assignee: Akamai Technologies, Inc., Cambridge, MA (US)

( * ) Notice: Subject to any disclaimer, the term of this patent is extended or adjusted under 35 U.S.C. 154(b) by 44 days.

(21) Appl. No.: 17/133,966

(22) Filed: Dec. 24, 2020

(65) Prior Publication Data
US 2021/0226987 A1    Jul. 22, 2021

Related U.S. Application Data

(60) Provisional application No. 62/955,633, filed on Dec. 31, 2019.

(51) Int. Cl.
*G06F 15/173* (2006.01)
*H04L 9/40* (2022.01)
*H04L 67/306* (2022.01)

(52) U.S. Cl.
CPC ...... *H04L 63/1441* (2013.01); *H04L 63/0892* (2013.01); *H04L 63/1408* (2013.01); *H04L 67/306* (2013.01)

(58) Field of Classification Search
CPC ............. H04L 63/0815; H04L 63/0892; H04L 63/102; H04L 63/1408; H04L 63/1441; H04L 63/205; H04L 67/306
(Continued)

(56) References Cited

U.S. PATENT DOCUMENTS 7,908,645 B2 * 3/2011 Varghese .............. G06F 21/552
715/833
8,555,357 B1 * 10/2013 Gauvin ............... H04L 63/1441
726/6
(Continued)

FOREIGN PATENT DOCUMENTS

WO    2016177437 A1    11/2016

OTHER PUBLICATIONS

PCT/US2020/067624, International Search Report and Written Opinion, dated Apr. 19, 2021, 12 pages.
(Continued)

*Primary Examiner* — Liang Che A Wang
(74) *Attorney, Agent, or Firm* — David H. Judson

(57) ABSTRACT

An account protection service to prevent user login or other protected endpoint request abuse. In one embodiment, the service collects user recognition data, preferably for each login attempt (e.g. data about the connection, session, and other relevant context), and it constructs a true user profile for each such user over time, preferably using the recognition data from successful logins. The profile evolves as additional recognition data is collected from successful logins. The profile is a model of what the user "looks like" to the system. For a subsequent login attempt, the system then calculates a true user score. This score represents how well the current user recognition data matches the model represented by the true user profile. The user recognition service is used to drive policy decisions and enforcement capabilities. Preferably, user recognition works in association with bot detection in a combined solution.

20 Claims, 18 Drawing Sheets

(58) Field of Classification Search
USPC .............................................. 709/223; 726/2
See application file for complete search history.

(56) References Cited

U.S. PATENT DOCUMENTS

| | | | | |
|---|---|---|---|---|
| 8,856,165 B1* | 10/2014 | Cierniak | ................. | G06Q 10/10 |
| | | | | 705/28 |
| 9,305,151 B1* | 4/2016 | Dotan | ...................... | G06F 21/31 |
| 10,079,854 B1* | 9/2018 | Scott | ........................ | H04L 67/02 |
| 2008/0127295 A1* | 5/2008 | Pirzada | ................. | G06F 21/562 |
| | | | | 726/1 |
| 2014/0337238 A1 | 11/2014 | Leighton | | |
| 2016/0021117 A1* | 1/2016 | Harmon | .................. | H04L 63/08 |
| | | | | 726/1 |
| 2017/0034179 A1* | 2/2017 | Carames | ................. | H04L 63/10 |
| 2017/0236106 A1* | 8/2017 | Lorberg | ............... | G06Q 20/027 |
| | | | | 705/42 |
| 2018/0159882 A1* | 6/2018 | Brill | .................... | H04L 63/0272 |
| 2018/0183825 A1 | 6/2018 | Kurupati | | |
| 2018/0332026 A1 | 11/2018 | Steeves et al. | | |
| 2019/0190950 A1 | 6/2019 | Senecal et al. | | |
| 2019/0230143 A1 | 7/2019 | Ludin et al. | | |
| 2020/0007585 A1 | 1/2020 | Williams | | |
| 2020/0387588 A1* | 12/2020 | Kurupati | ................. | H04L 63/08 |

OTHER PUBLICATIONS

Dey, K. A., "Mitigation of Identity Theft in Online Banking," University of Bergen Department of Informatics, Masters Thesis, Jun. 26, 2019 Y section 3.1, pp. 15-16.

Torkura, K. et al., "Securing Cloud Storage Brokerage Systems Through Threat Models," 2018 IEEE 32nd International Conference on Advanced Information Networking and Applications (AINA), Aug. 13, 2018, Sections 1-5, pp. 1-20.

* cited by examiner

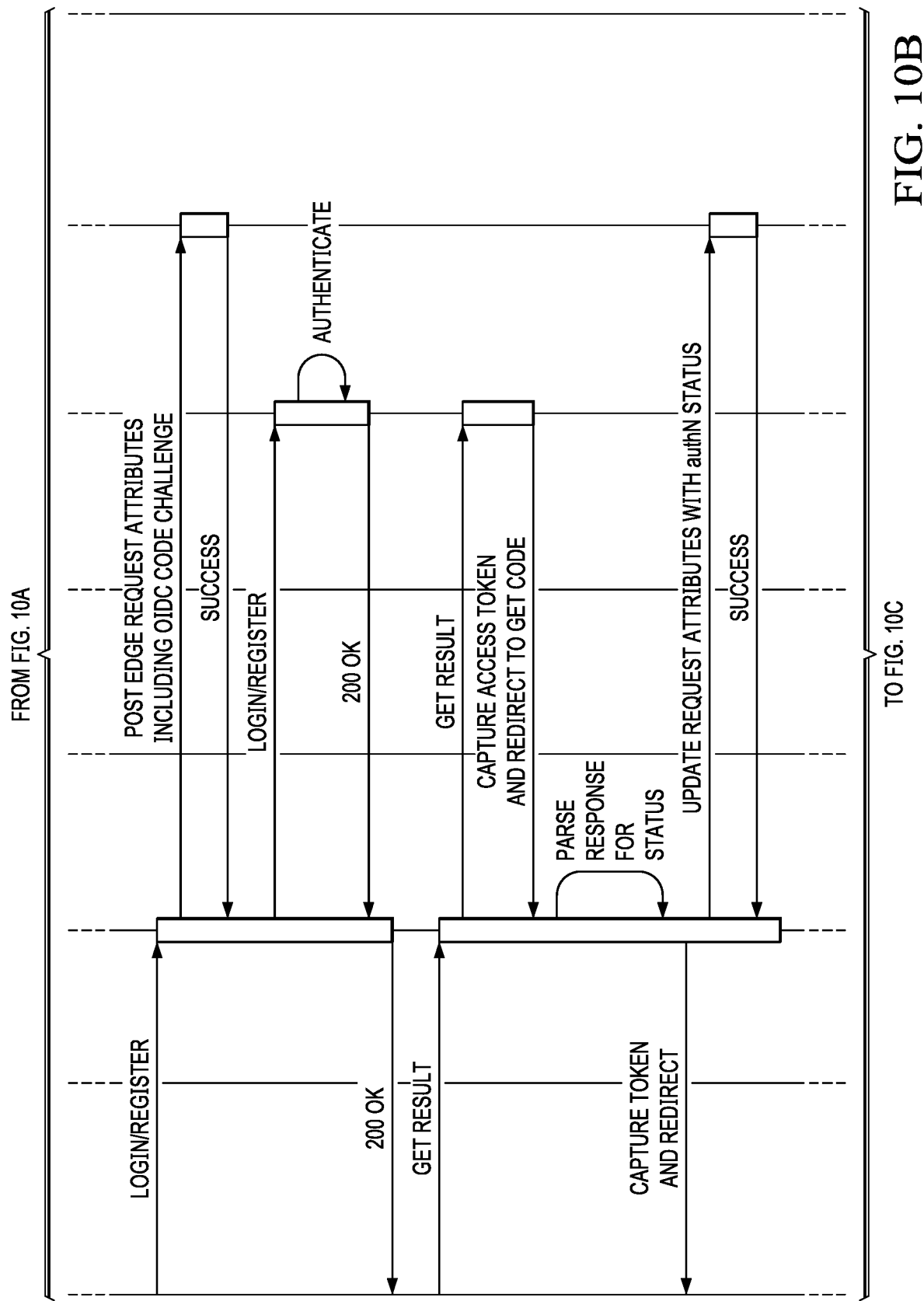

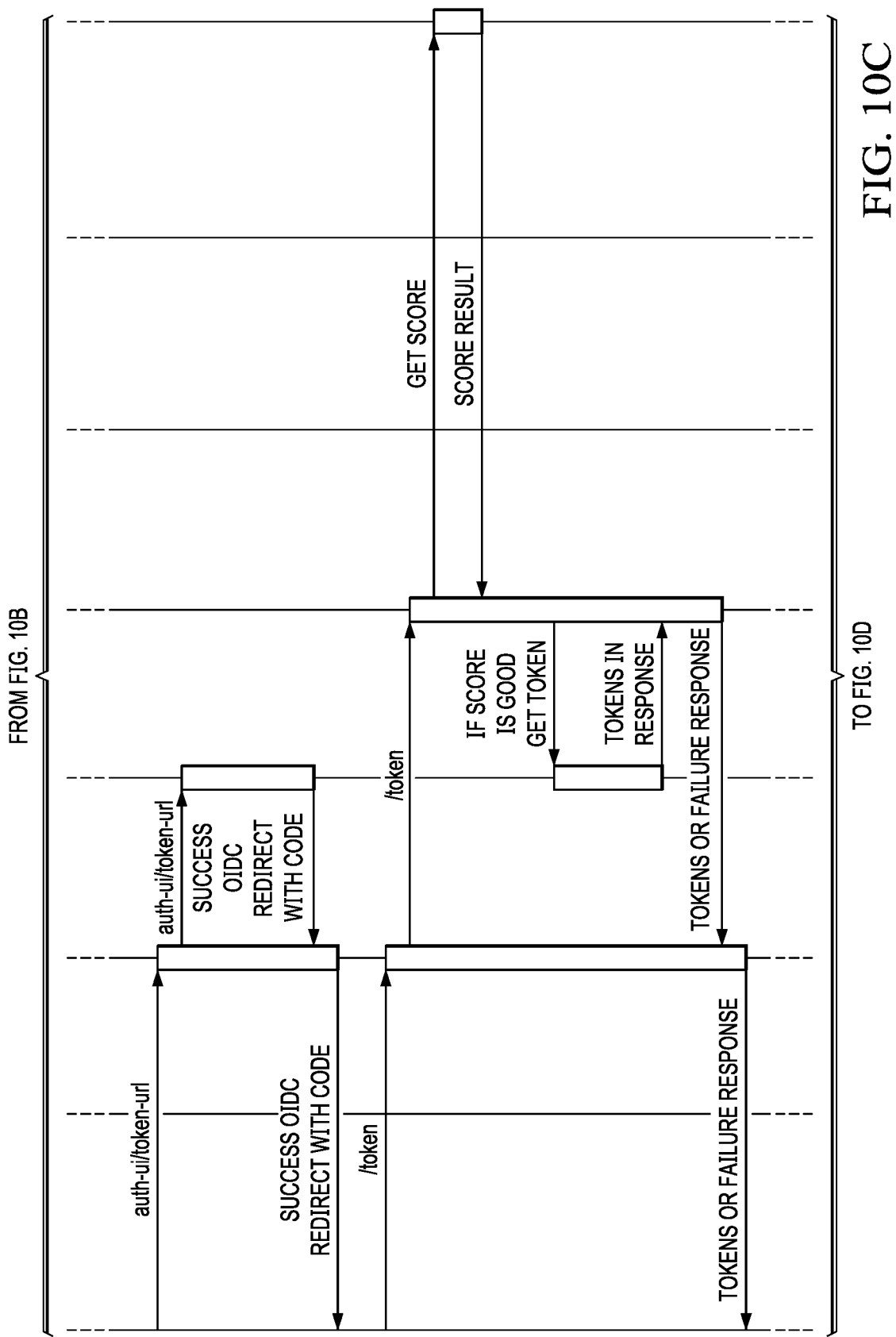

_US 11,570,203 B2_

EDGE NETWORK-BASED ACCOUNT PROTECTION SERVICE

BACKGROUND

Technical Field

This application relates generally to network security and, in particular, to techniques that prevent user account takeover and misuse.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Account takeover on the Internet is a significant problem. A quick search finds startling statistics, such as US$4B in losses due to account takeover in 2018. There are known technologies and services that address this problem. For example, and in the CDN space, Akamai® Bot Manager helps mitigate bot-driven credential abuse and account takeover attempts; while solutions of this type provide significant advantages, they do not address human-driven account takeover. Accordingly, a bot detection system cannot necessarily determine that an authenticating user is who they say they are when there is a question of trust, e.g., when the user's password itself has been stolen in an account takeover attack. Step-up authentication may be useful in this situation, but there remains a need to provide an enhanced solution to this problem.

BRIEF SUMMARY

A content delivery network is augmented to include a "user recognition" (sometimes referred to herein as an "account protection") service to prevent user login or other protected endpoint request abuse, preferably in association with a bot detection system. User recognition as used herein is the term for a feature that recognizes a user not necessarily (or solely) based on a provided user identifier and credentials, but also on other one or more other characteristics. In one embodiment, the service collects user recognition data, preferably for each login attempt (e.g. data about the connection, session, and other relevant context), and it constructs a true user profile for each such user over time, preferably using the recognition data from successful logins. Preferably, the profile evolves as additional recognition data is collected from successful logins. As such, the true user profile is a model of what the user "looks like" to the system. For a subsequent login attempt, the system then calculates a true user score. This score represents how well the current user recognition data matches the model represented by the true user profile. Preferably, the user recognition service is used to drive different policy decisions and enforcement capabilities. Thus, e.g., for an account protection service, user recognition facilitates enforcing a policy-driven security model, e.g., as a policy decision point (PDP) that determines what action to take on an authentication attempt, and the ancillary control by a policy enforcement point (PEP) that implements a policy decision. Preferably, user recognition such as described above works in association with bot detection in a combined solution.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIGS. 10A, 10B, 10C and 10D together depict a sequence diagram of the operation of the architecture components shown in FIG. 9;

DETAILED DESCRIPTION

Figure 1:
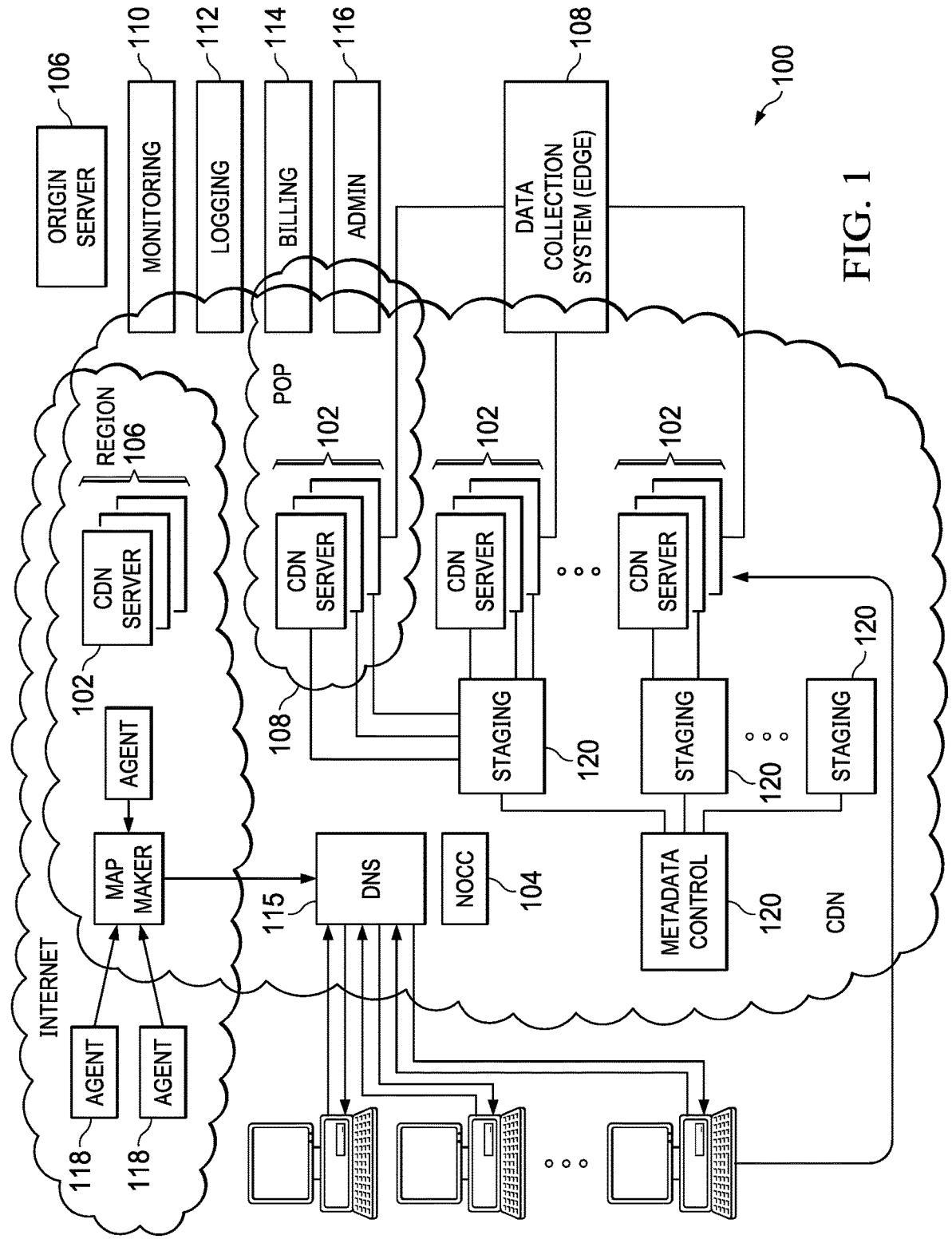
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102*a-n* distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
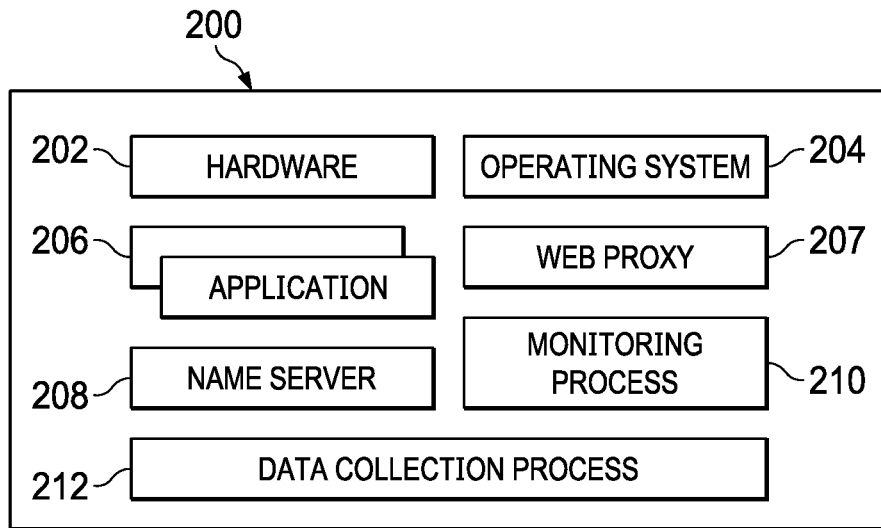
FIG. 2 is a representative CDN edge machine configuration.

As illustrated in FIG. 2, a given machine 200 comprises commodity hardware (e.g., an Intel® processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" (gHost) process), a name server 208, a local monitoring process 210, a distributed data collection process 212, and the like. The HTTP proxy 207 serves web objects, streaming media, software downloads and the like. A CDN edge network running machines of this type support HTTP Adaptive Streaming (HAS), which uses standard HTTP servers and TCP to deliver the content, thereby allowing CDNs to leverage the full capacity of their HTTP networks to deliver streaming content instead of relying upon smaller networks of dedicated streaming servers. The two dominant HAS formats are Apple® HTTP Live Streaming (HLS), and MPEG DASH. HLS traditionally used TS containers to hold muxed audio and video data, while DASH preferred the ISO-Base Media File Format holding demuxed tracks. Accordingly, content owners wanting to reach the diversity of devices have to package and store two sets of files, each holding exactly the same audio and video data. To address this inefficiency, the Common Media Application Format (CMAF) was developed in 2017. CMAF is a restricted version of the well-established fragmented mp4 container and is similar to the DASH-ISO file format. CMAF is a standardized container that can hold video, audio or text data. CMAF is efficient because CMAF-wrapped media segments can be simultaneously referenced by HLS playlists ad DASH manifests. This enables content owners to package and store one set of files.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Figure 3:
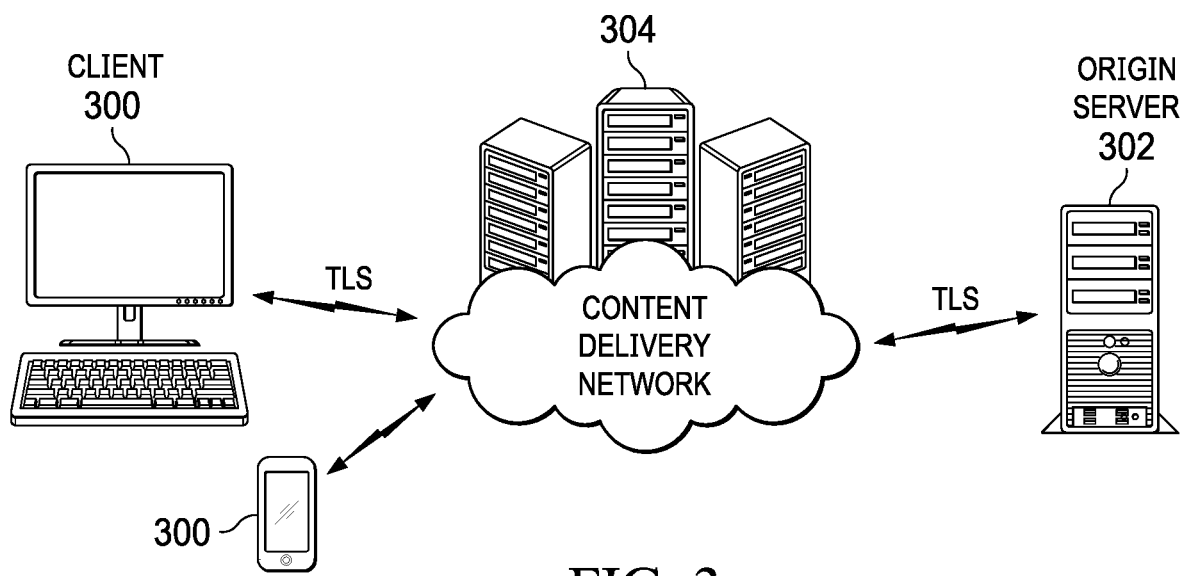
FIG. 3 depicts a representative client machine interaction with an origin server via a content delivery network.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting.

A content delivery network such as described above may provide bot detection. A representative approach is described in U.S. Publication No. 2019/019950, assigned to the assignee of this application, and the disclosure of which is hereby incorporated by reference. In a related approach, an overlay network edge server (such as depicted in FIG. 2) interacts with a bot detection service to provide active bot detection as a requesting client interacts with the overlay network edge server. In a typical interaction, and upon initiation of a session between a requesting client and the overlay network edge server, the edge server sets a long-term cookie and a short-term cookie in association with returning a page (typically, a base HTML page) to the requesting client. In an asynchronous mode of operation, the edge server injects into that page a reference to a data collection script. The script is configured to record one or more interactions at the requesting client, to collect sensor data about the interactions, and to send the collected sensor data from the requesting client back to the edge server. After the client receives the page and instantiates the script locally, the sensor data is collected and forwarded back to the edge server through a series of automatic posts (e.g., JSON-formatted POST requests), wherein a particular post typically is associated with a behavioral action occurring locally at the requesting client. The edge server then forwards the posts onward to the bot detection service (via a service API) to enable the service to evaluate whether the requesting client is a human or a bot. During this asynchronous mode of data collection, the edge server may then receive a request for the protected endpoint. When this occurs, and in a synchronous mode of operation, the edge server issues a query to the bot detection service to obtain a threat score associated with the requesting client. The threat score typically is based at least in part on the collected sensor data that has been received and forwarded by the edge server. The edge server receives the threat score from the bot detection service. Based at least in part on the threat score received in response to the query, the edge server then determines whether the request for the endpoint should be forwarded onward for handling, typically by an origin server that hosts the protected endpoint.

Bot detection in this manner works well, although it takes time to gather telemetry and to decide if a requesting entity is a bot. False positives are also resource-inefficient.

It is also assumed that the CDN has some basic capability to recognize an account owner and to provide an access decision based on such recognition. In particular, a system of this type has the capability to determine that it has seen a particular user previously, typically based on data that the system holds that allows such recognition, and this is so whether or not the system also knows the user's actual identity (who he or she purports to be). A representative system of this type is Akamai® Identity Cloud, which provides a secure, seamless, scalable customer identity and access management (CIAM) service. This service provides for a wide array of authentication methods, including social media login, directory services, and OpenID Connect (OIDC), role-based and attribute-based access control (RBAC and ABAC), and risk-based and multi-factor authentication options, for secure access and single sign-on (SSO) across the customer's ecosystem. Preferably, the service is cloud-native, and it is provided (in association with one or more other CDN services) as a service (namely, a SaaS) solution. As such, it is designed to intelligently scale to ensure that customer registration, authentication, and SSO functions are always available and perform with the lowest latency. Both customer API- and SDK-based implementations are supported to facilitate rapid deployment.

User recognition and identification are different constructs, and preferably both are necessary to prevent login (credential) misuse or fraud. In particular, a system may produce an identification result with low confidence (in other words the user's actual identity is unknown), yet the user may still present valid credentials. Similarly, the system may produce a recognition result with high confidence (in other words the system has seen this user before) but without necessarily knowing who the user is. A preferred approach for enabling access to a protected resource is for the system to only do so when it has high (or at least some sufficient) confidence that it can both identify who the user is, and that it can also recognize that is has previously seen that user.

With the above as background, the techniques of this disclosure are now described.

User Recognition/Account Protection

According to one embodiment of the techniques herein, a system extends a CIAM service to provide an additional user recognition function. The user recognition service determines if an entity attempting to log into an account is the true user who owns the account or is sufficiently "different" from the true user such that the system should take some mitigation or validation action. Preferably, for every user, a true user profile is constructed. This is a statistical profile of the true user that has been gathered over time, and that is regularly updated based on successful logins. Preferably, only data from successfully authenticated user sessions is compiled into the true user profile. For each login attempt, user recognition data is gathered. Preferably, this is a set of data that comprises the session, connection and context data that is used to recognize a user. Preferably, this data is collected by the edge server, leveraging a script (e.g., a JavaScript (JS)) that is injected for login sessions and by the CIAM service, or otherwise. In real-time, preferably the system computes a true user score. This is the match score between a session's user recognition data (URD) and the true user profile (TUP) for a given user (UUID). Preferably the true user score is normalized into the range 0 to 10 (or 1 to 100). A score of 0 means that there is essentially no match between the current session's URD and the TUP. In this scoring embodiment, a score of 10 (or 100) means that there is a strong match between the current session's URD and the TUP. Based on the score, the system can then take an appropriate action, e.g., the ability to block (or challenge, or slow down, etc.) any entity that (upon presenting to a customer login page) is not sufficiently "similar" to the true user.

Advantageously, the above-described user recognition approach may be used in conjunction with a bot detection. This enables the system to lower bot detection false negatives. In particular, it is known that bot developers continue to evolve their software to avoid detection as a bot. They do this by experimenting with making their software act more like a human (matching real browser headers, human-like mouse/device movement and keypress cadence, trial and error, etc.). In so doing, they compare their software against real humans, any humans, for validation or training. That said, the one thing that they cannot do is train their software to act like a specific human, let alone the user whose credentials they are trying to compromise. As the user recognition models improve, the more distinct each true user will appear, thereby making it increasingly difficult for a bot developer to chance upon the right combinations of user characteristics when trying to compromise user credentials generally. Even if a bot can evade standard bot detection and present the correct credentials, user recognition (as provided for herein) still detects the imposter, blocks access, and provides the bot detection system with a false negative feedback loop it can use to improve its own algorithms.

Figure 4:
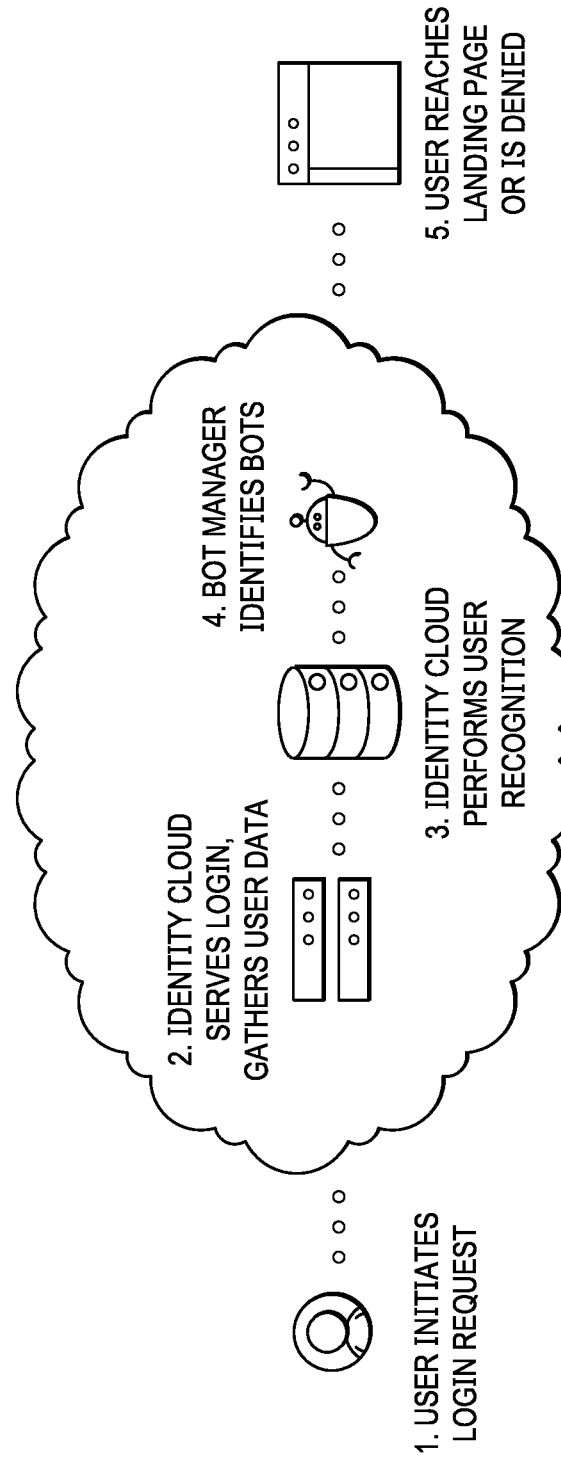
FIG. 4 is a high level depiction of a user recognition service that provides for real-time detection of false users according to the techniques of this disclosure.

FIG. 4 depicts the combined technique in operation for this embodiment. Systems/services identified by their commercial names (Akamai® Identity Cloud, Akamai® Bot Manager) are merely exemplary and are not intended to be limiting. At step (1), the user initiates a login request. At step (2), Identity Cloud (the CIAM service) services the login, and gathers user data (as explained in more detail below). At step (3), Identity Cloud performs user recognition as provided for herein. At step (4), Bot Manager (the bot detection service) identifies bots. At step (5), the user reaches the landing page (when no login fraud is detected) or is denied (when a potential login fraud is detected). According to the approach herein, the true user score enables the CIAM (or other) service to measure end user risk.

There are several possible implementation approaches (use cases), several of which are now described. In general, the solution assumes a CDN implementation wherein a CIAM service is utilized to provide hosted login (as identity provider) for the CDN customer's application; preferably, the CDN also provides an edge-based application security service, such as Akamai® Kona™ Site Defender, that further protects the customer's application. Kona Site Defender provides various techniques, such as a web application firewall (WAF), distributed denial-of-service (dDoS) attack mitigation, and the like, to protect the application. As used herein, the CIAM service delivered through the CDN and protected by the Site Defender is sometimes referred to as a secure edge. As will be described below, it is not required that the techniques herein be implemented in this particular use context (e.g., involving a CIAM service)

Figure 5:
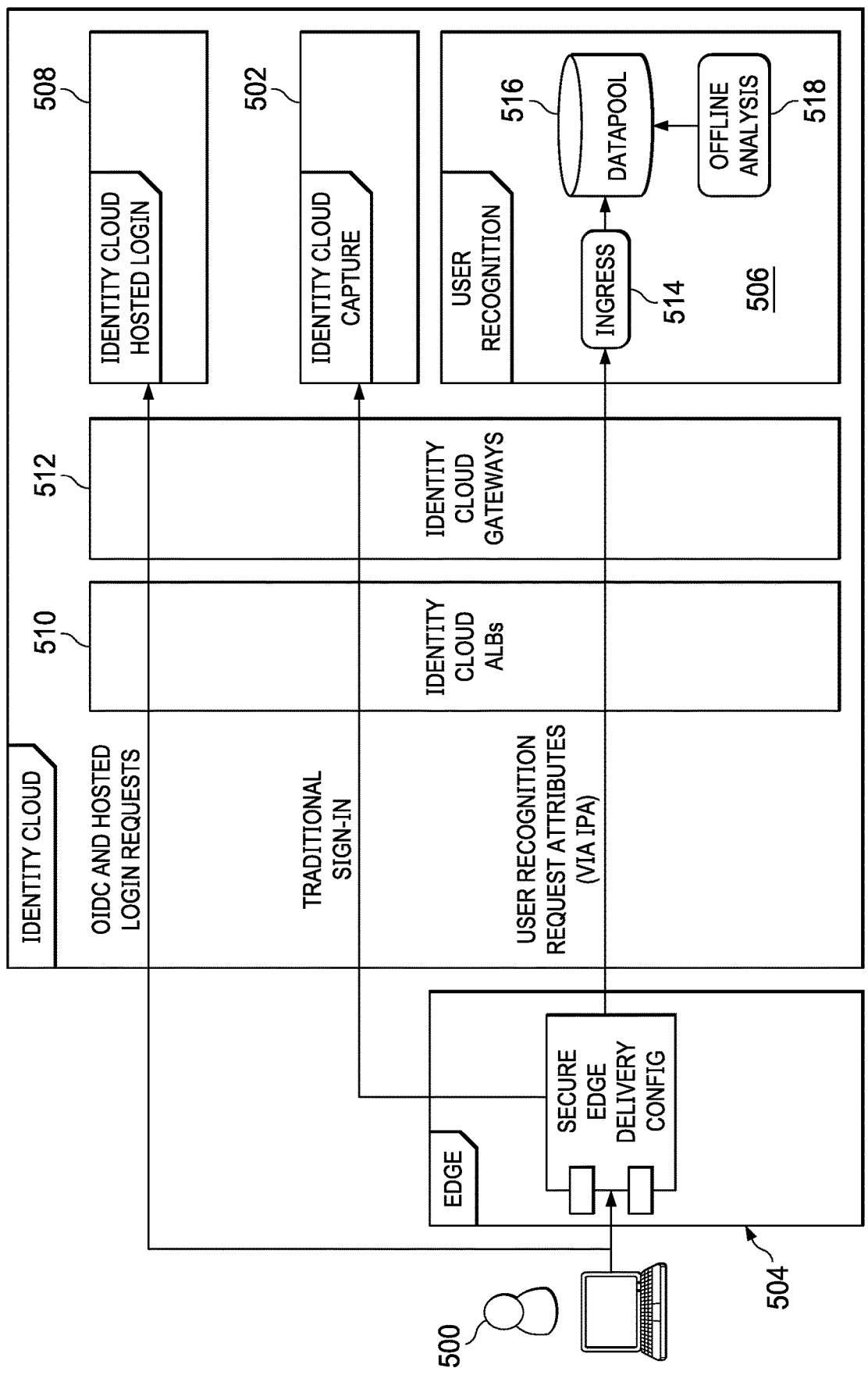
FIG. 5 depicts a logical diagram of components and their connections in a first use case.

In a first use case, initial (preliminary) data collection is performed and used by the system. One workflow is as follows, and as shown in FIG. 5. Some entity 500 purporting to be a permitted user of the application attempts to log in to the application that uses the CDN's CIAM service (hosted login) as its identity provider. The user chooses a traditional sign-in and submits his or her username and password to component 502. The secure edge 504 receives the client request and extracts a set of connection attributes. The secure edge sends the attributes to a user recognition service 506, and it also forwards the login request to a login component 508 of the CIAM service to determine whether the login is recognized. The login component makes a determination and sends the login results back to the client via the secure edge. The secure edge detects the login status and sends it (the status) back to the user recognition service 506, and it also returns the login result to the client 500. The client then either shows a login failure message or completes authentication, e.g., by sending an access token to hosted login and following the rest of the usual authentication process.

Figure 6A:
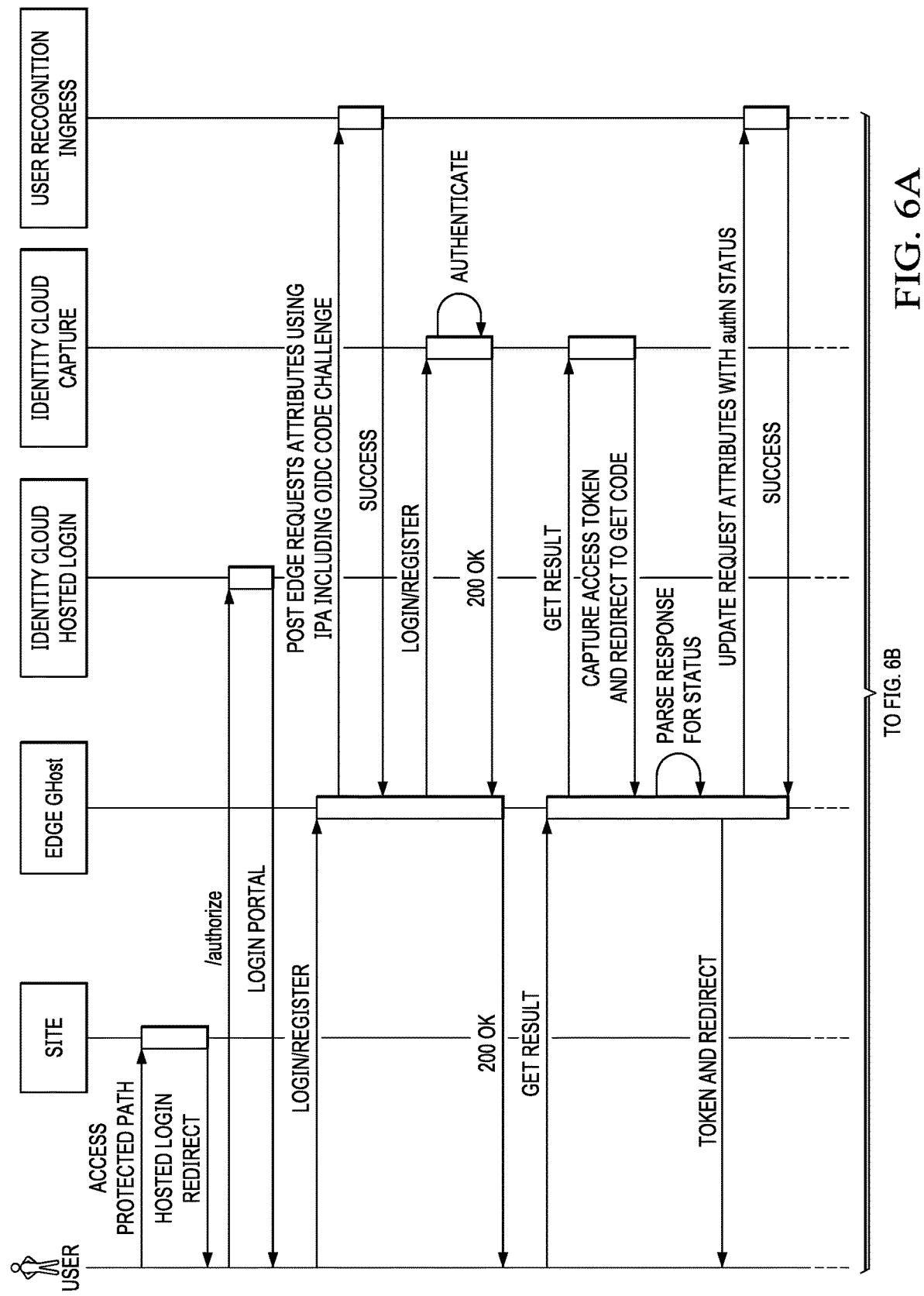
FIGS. 6A and 6B together depict a sequence diagram of the operation of the architecture components shown in FIG. 5.
Figure 6B:
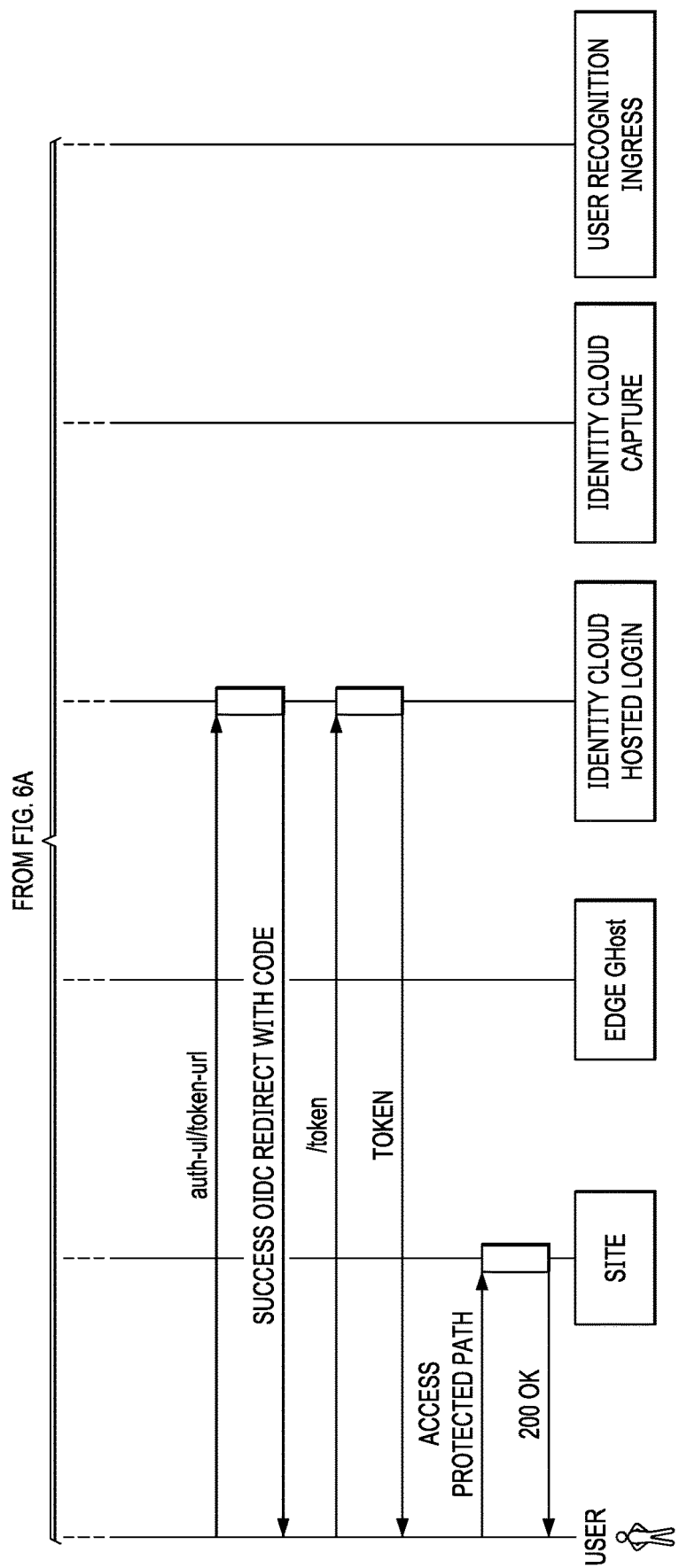

FIG. 5 depicts a logical diagram of components and their connections in a first use case; in this embodiment, the services are provided through services architecture that includes (in this example) a load balancing component 510, and a gateway component 512. The user recognition service includes an ingress component 514, a database 516, and an analysis component 518 for the scoring. In this example, all of these components are accessible to the edge server at a cloud service (here, designated the Identity Cloud). FIGS. 6A and 6B together depict a sequence diagram of the operation of the architecture components shown in FIG. 5, with the site representing a service customer origin.

In a second use case, additional data is also gathered from the client user agent if that agent runs a script (e.g., JavaScript). One workflow is as follows. Some entity purporting to be a permitted user of the application attempts to log in to the application that uses the CDN's CIAM service (hosted login) as its identity provider. The secure edge detects the CDN customer and causes a user recognition service script to be downloaded along with the rest of the hosted login's page components. Asynchronously or synchronously, the script collects device- and user agent-specific attributes for user recognition, and, via the secure edge, sends them to the user recognition service. The user chooses a traditional sign-in and submits his or her username and password. The secure edge receives the client request and extracts a set of connection attributes. The secure edge sends the attributes to a user recognition service, and it also forwards the login request to a login component ("capture") of the CIAM to determine whether the login is recognized. The login component makes a determination and sends the login results back to the client via the secure edge. The secure edge detects the login status and sends it (the status) back to the user recognition service, and it also returns the login result to the client. The client then either shows a login failure message or completes authentication, e.g., by sending a capture access token to hosted login and following the rest of the usual authentication process.

Figure 7:
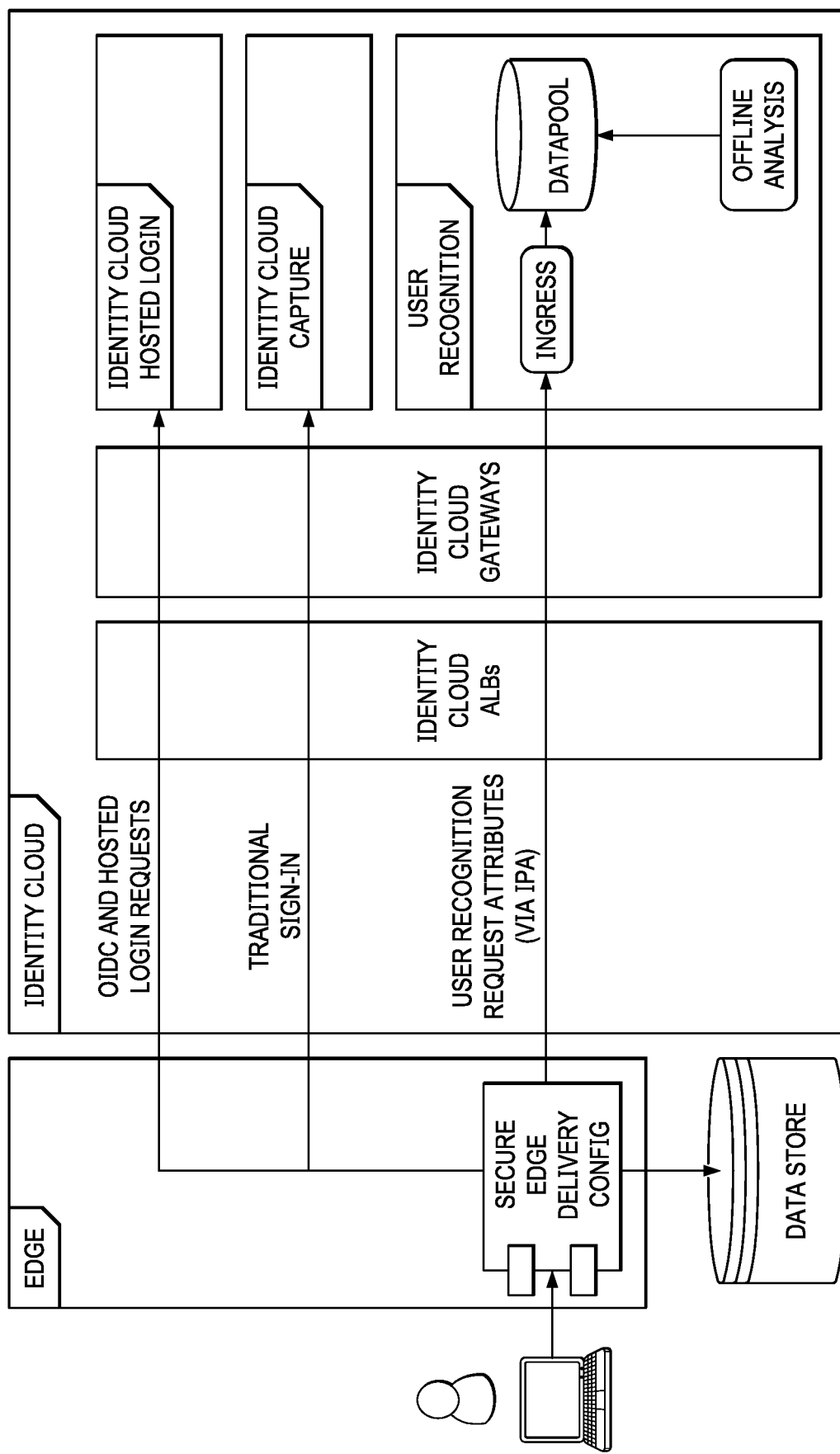
FIG. 7 depicts a logical diagram of components and their connections in a second use case.
Figure 8A:
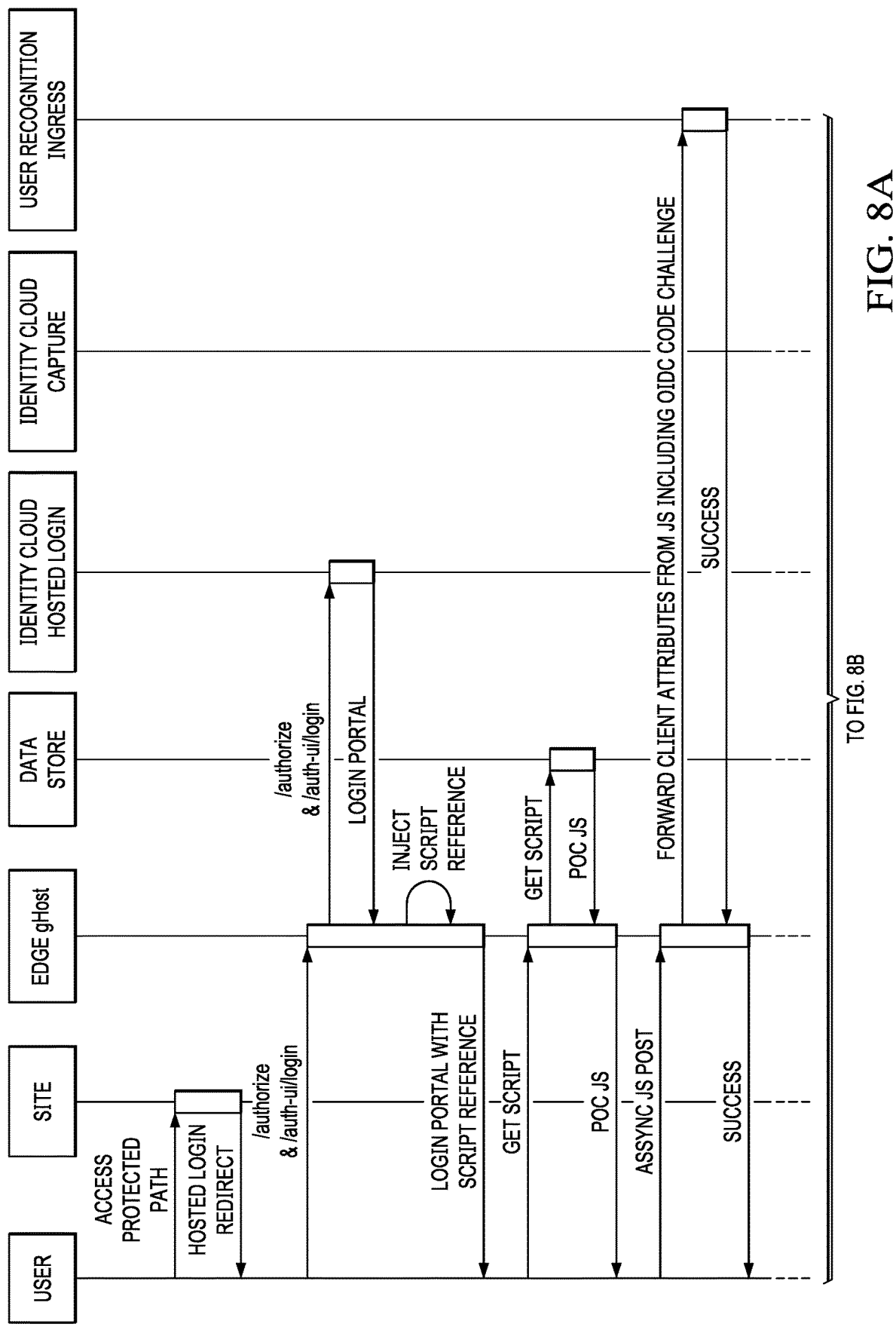
FIGS. 8A, 8B and 8C together depict a sequence diagram of the operation of the architecture components shown in FIG. 7.
Figure 8B:
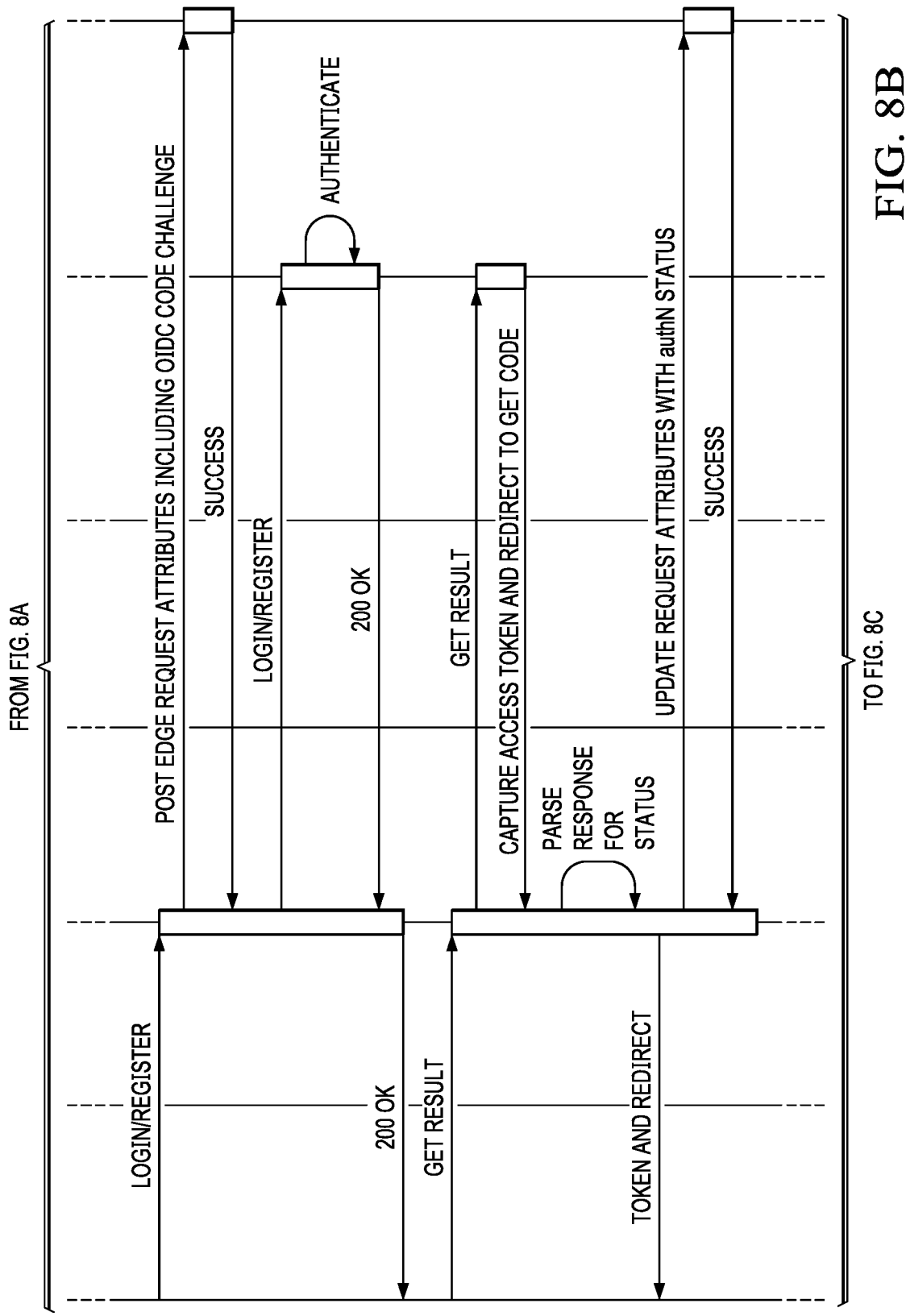
Figure 8C:
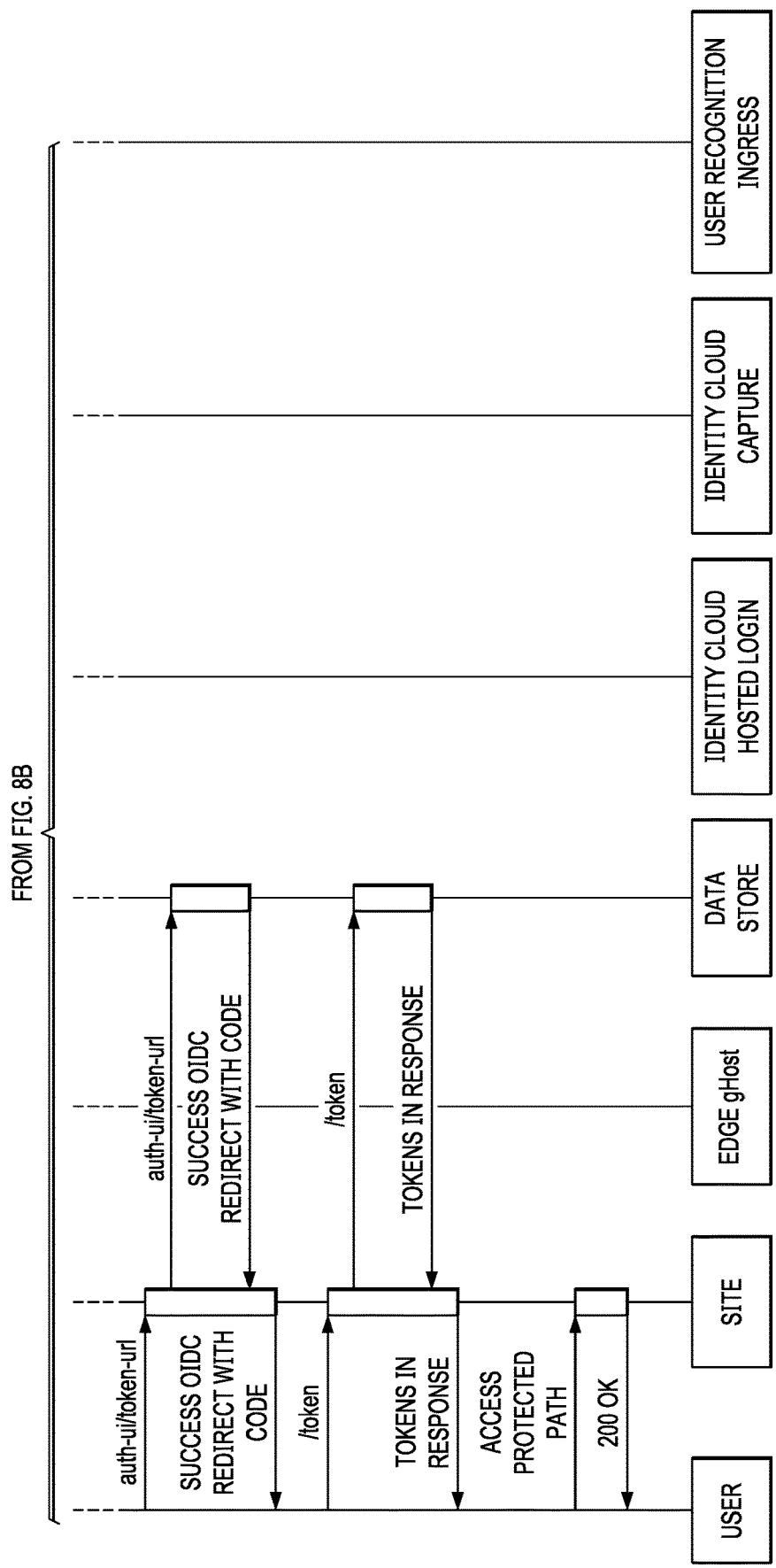

FIG. 7 depicts a logical diagram of components and their connections in the above-described second use case; the components here correspond to those in FIG. 5. FIGS. 8A, 8B and 8C together depict a sequence diagram of the operation of the architecture components shown in FIG. 7.

Figure 9:
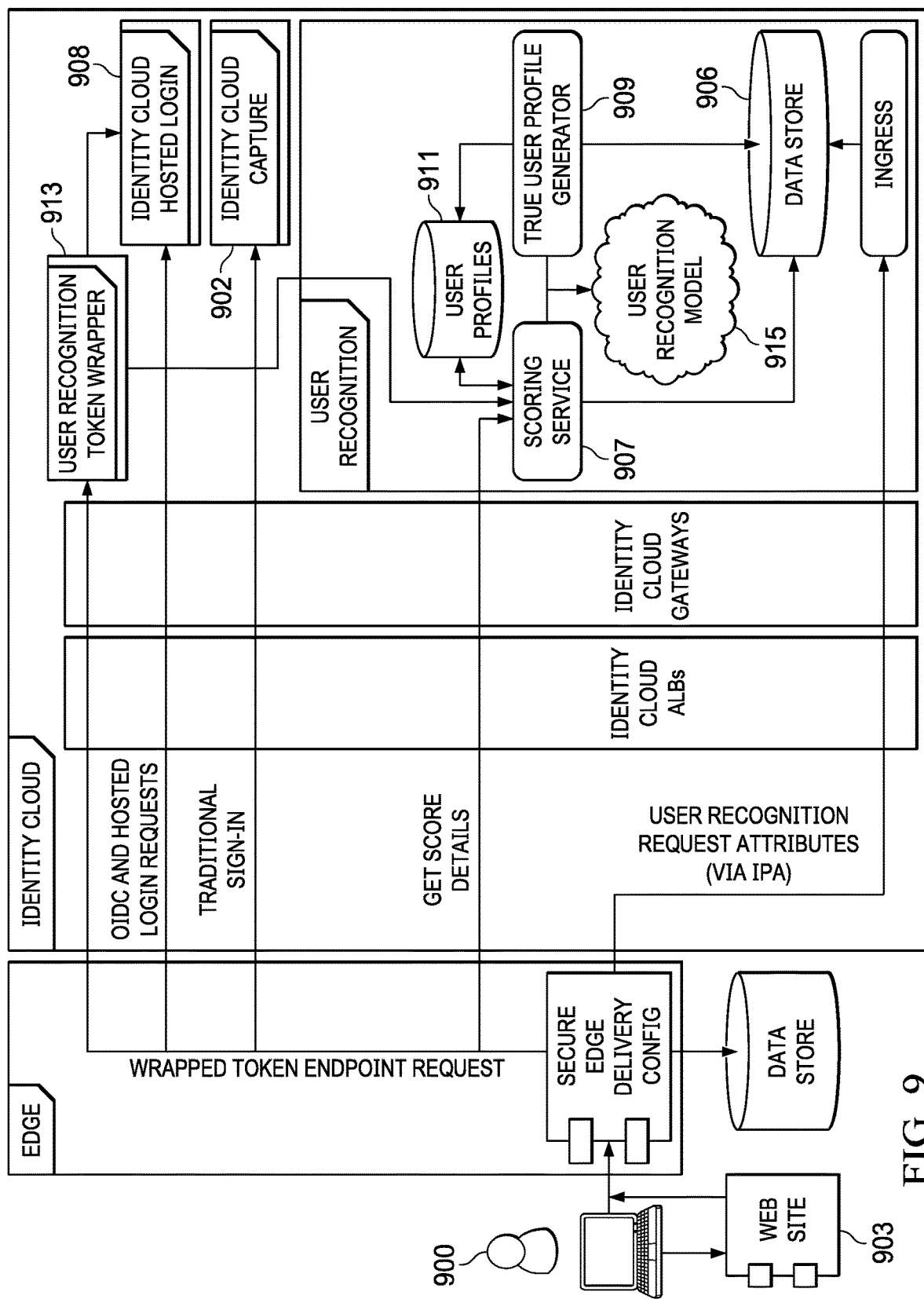
FIG. 9 depicts a logical diagram of components and their connections in a third use case.
Figure 10A:
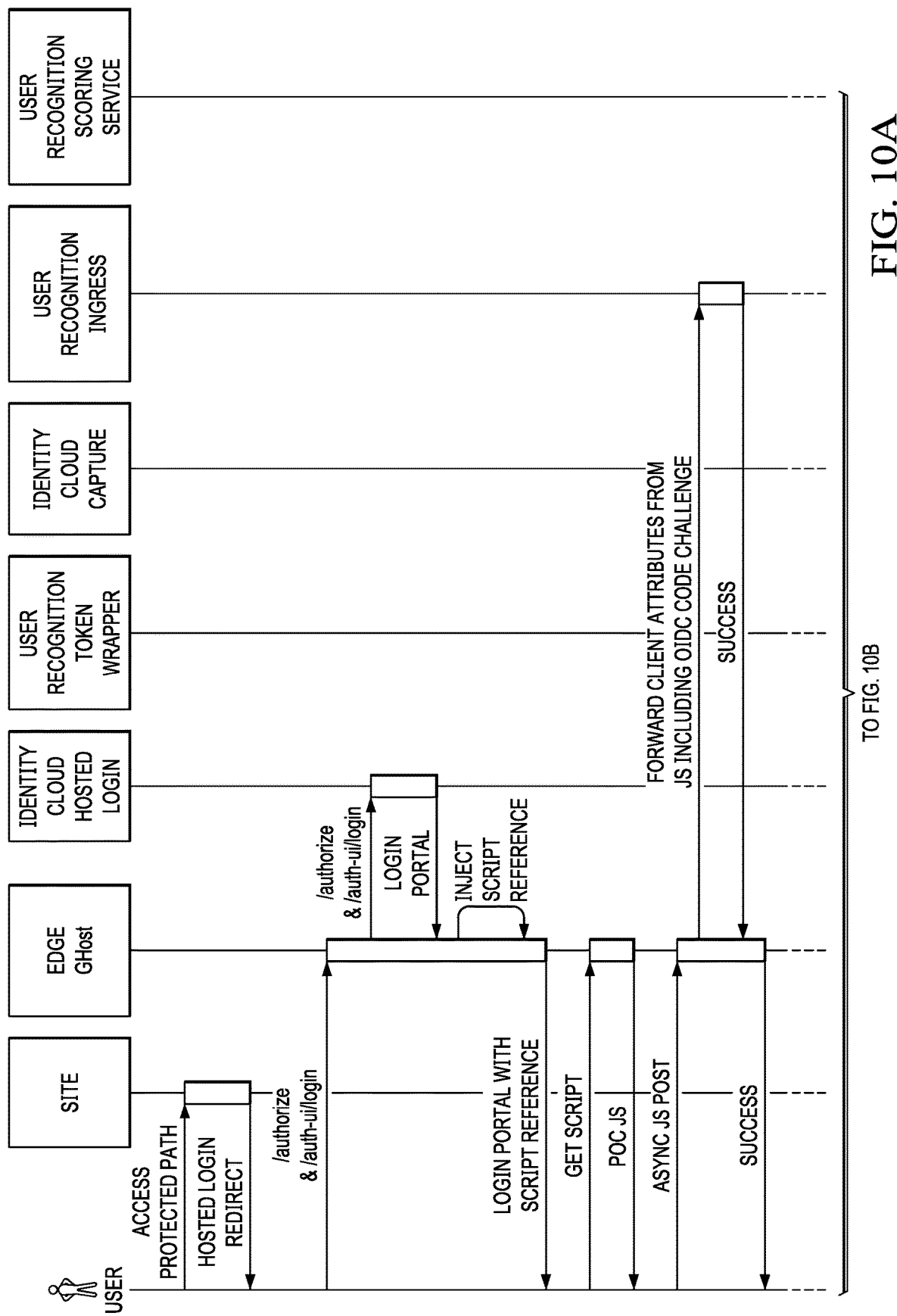
Figure 10D:
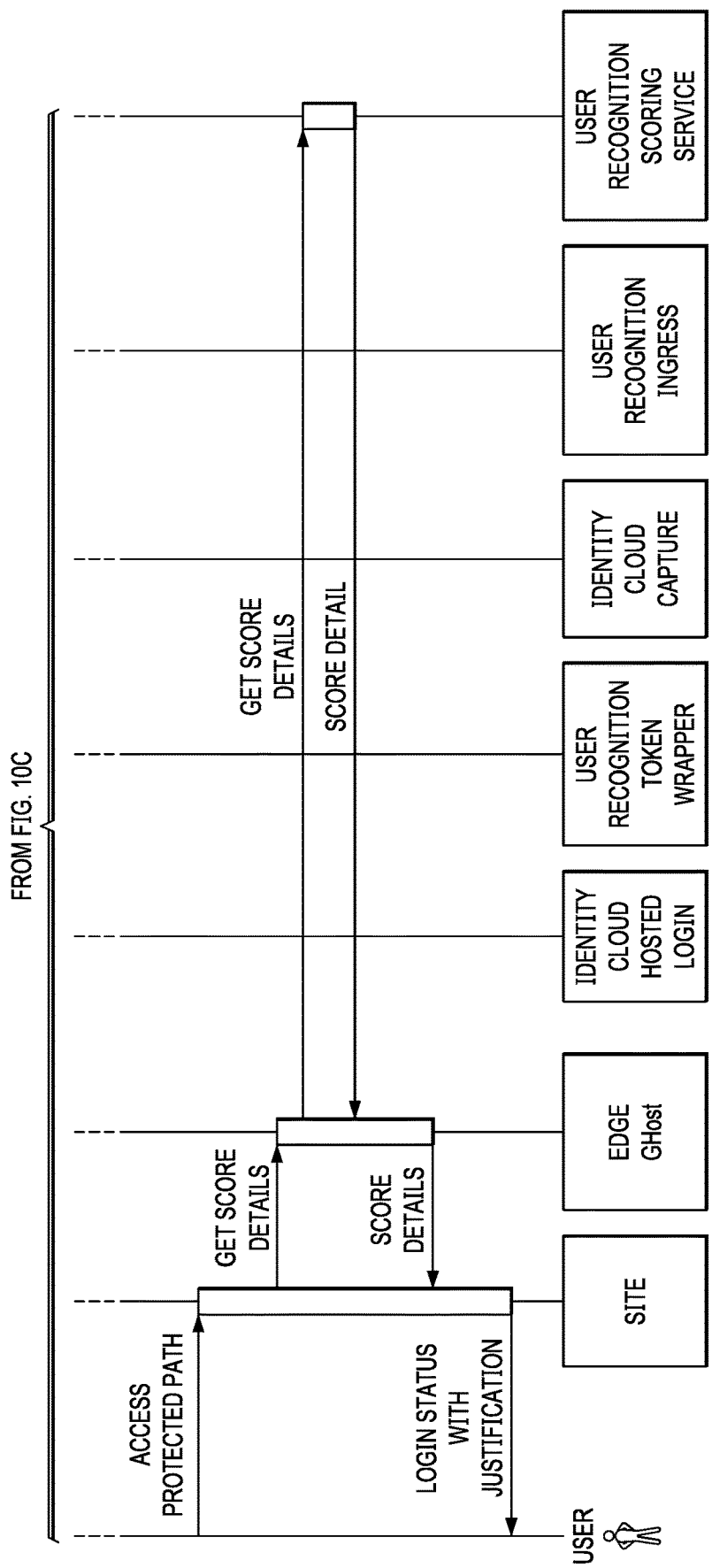

In a third use case, previous successful logins have been used to generate a true user profile (TUP) and the user or an impersonator now logs in. In this embodiment, and as depicted in FIG. 9, the user recognition service 906 comprises a scoring service 907, and a true user profile (TUP) generator 909 that generates user profiles 911. In this embodiment, the system collects attributes about the device, user agent, and session, and uses the scoring service 907 to calculate the true user score (TUS). The score is then to enable a policy-based decision about whether to allow access for a login attempt. One workflow is as follows. Some entity 900 purporting to be a permitted user of the application attempts to log in to the application 903 that uses the CDN's CIAM service (hosted login 908) as its identity provider. The secure edge 904 detects the CDN customer and causes a user recognition service script to be downloaded along with the rest of the hosted login's page components. Asynchronously or synchronously, the script collects device- and user agent-specific attributes for user recognition, and, via the secure edge 904, sends them to the user recognition service 906. The user chooses a traditional sign-in 902 and submits his or her username and password. The secure edge 904 receives the client request and extracts a set of connection attributes. The secure edge 904 sends the attributes to the user recognition service, and it also forwards the login request to a login component 908 of the CIAM to determine whether the login is recognized. The login component 908 makes a determination and sends the login results back to the client via the secure edge 904. The secure edge detects the login status and sends it (the status) back to the user recognition service, and it also returns the login result to the client. The client then either shows a login failure message or continues authentication by sending the capture access token to hosted login. If the username and password were correct, the client is then redirected with an authorization code to an OpenID Connect (OIDC) token endpoint 913. The OIDC token endpoint 913 looks up the true user score (TUS) for this login session. If the score is better than a risk threshold, tokens are issued and the client logs the user into the web site; if the score is worse than the risk threshold, no tokens are issued and the client redirects to a failure page. In both scenarios, the client preferably accesses an application programming interface (API) to look up a rationale for the true user score.

FIG. 9 depicts a logical diagram of components and their connections in the above-described use case; FIGS. 10A, 10B, 10C and 10D together depict a sequence diagram of the operation of the architecture components shown in FIG. 9.

The following describes data collection that may be implemented in one or more of the above-described use cases.

Preferably, edge server (or "edge") data collection gathers information specific to the HTTP request that may differ between or among users, user agents or devices. This might include, without limitation, the geolocation of the client, the user-agent header, and a TLS fingerprint. Preferably, this information does not include data that is not client request-specific, such as the current CPU load on the edge server. Preferably, edge data collection and forwarding to the user recognition service does not increase request processing time by more than a predetermined (low) percentage value, and preferably edge data collection does not change the response sent to the user. Further, preferably only data from a traditional sign-in is collected.

Client data collection refers to the data collected directly at the client using JavaScript (JS) or other methods. Preferably, client data collects attributes such as screen orientation, browser plug-ins, local time zone. Client data collection must be sensitive to and honor privacy regulations, and it should not impact authentication or other request flows. As described above, client data collection preferably goes through the edge, whether implemented in an existing HTTP request flow or in a separate, asynchronous request.

When a data model (FIG. 9, 915) is implemented, preferably an output of the data modeling process includes a definition of how to store, accumulate and expire data, namely, a true user profile (TUP), that can be used with the model and that stays up-to-date over consecutive user log-ins. The data modeling process also output a model (algorithms and weights) that can compare a current authentication request's user recognition data with the TUP so as to calculate a TUS.

Preferably, when implemented the true user profile (TUP) contains an indicator of whether sufficient data has been collected for the TUP to be considered useable in generating a true user score (TUS). Preferably, the TUP includes data only from successful authentication events, including whether the TUS at authentication time was trustworthy enough. Preferably, the TUP is explainable, e.g., what user recognition data attributes aligned with the TUP and which ones deviated. Further, the TUP preferably supports frequent and infrequent users.

When implemented, preferably the TUS is instantiated as a simple numeric value (for policy decision-making). As noted, preferably the TUS has associated information available for explain what parts of the user recognition data aligned with the TUP and which one deviated and by how much. Example data points include, without limitation: current TUS versus the last 5 TUSs and their policy decisions, sample location data versus previously seen locations, user agent data versus previously seen user agents, time of day versus previously seen times, etc. Preferably, the TUS is computed in real-time so as not to slow down the login flow.

Preferably, the threshold between a trustworthy and untrustworthy TUS is configurable.

Preferably, policy enforcement is configurable.

Preferably, when the TUS is not trustworthy (worse than a threshold), preferably no identity, access or refresh tokens are issued.

As previously described, delivery configurations at the CDN edge may be used to coordinate collecting data to be stored and for use in initial data modeling, and to facilitate the TUS calculation based on the collected data. In one example embodiment (FIG. 9) policy decision-making and enforcement is implemented in a wrapper for an OIDC token endpoint. In the first use case described above (FIGS. 5-6), data collection occurs just at the edge for initial data modeling. In the second use case described (FIGS. 7-8), the deployment of hosted login to a secure edge also delivers JavaScript (JS) to the browser for additional data collection from the client. In the second use case, a script tag is injected on the hosted login's HTML page, and that script's telemetry is obtained off a subsequent request. The script is used to grab user agent and device-specific data. The client data adds useful diversity to the data to enable the user recognition service to better identify when an authentication appears to come from someone other than the true user.

In the third use case described above (FIGS. 9-10), a user recognition model based on the data collected (from the edge and the client) is generated. A service is provided to generate true user profiles based on attributes collected and the user recognition model. A repository is provided to store the true user profiles. A service is provided to generate true user scores based on true user profiles, the attributes for the current request, and the user recognition model. Preferably, a token endpoint wrapper is provided that checks the TUS and applies a policy based decision, only getting the OIDC tokens when the score is good enough. In one embodiment, the token endpoint wrapper provides a bridge or proxy between the hosted login's OIDC token interface and the user recognition scoring service; externally to the client, it exposes a token endpoint. It receives the authorization code from the client and acts on the client's behalf with the real hosted login token endpoint, exchanging the code for a set of tokens (identity, access, refresh). Preferably, the wrapper does not exchange the code for tokens without first requesting a score for the authentication session from the scoring service. It does this by calling the scoring service's endpoint (e.g., on the secure edge) and looking up the score for a particular session ID. The "code challenge" may be used as the session ID. The token request comes in from the client with a "code verifier," so the token endpoint wrapper must calculate the code challenge from the verifier and use that as the session ID in the score lookup. Preferably, the token endpoint wrapper is a Policy Decision Point (PDP), making a decision regarding whether the score is high enough to proceed with the code for token exchange. As also noted, the mechanism also preferably retrieves the TUS rationale upon login success or failure and, if appropriate, presents the information visually.

The scoring service exposes an endpoint on which it receives a request to retrieve a score, retrieves attributes for the current authentication event, retrieves (from profile storage) the profile for the currently authenticating user, calculates the score according to the TUS algorithm, returns the score, and preferably on the same endpoint returns data on how the scoring decision was made.

The techniques as described above provide significant advantages. One advantage is that the approach leverages CDN information for risk analysis. Most CIAM and authentication services depend upon data gathered from the client or the information they receive directly at their authentication service off the wire to make a risk determination. However, clients increasingly block data collection with ublock-like plugins and other JS restrictions; further, performance and scalability suffers even in the cloud, if services like these are not distributed via a CDN, but a CDN (by its nature as an application level proxy) also will mask key risk factors of the client. The solution herein collects key risk factors about the client at the CDN edge and contributes them to the CIAM server's risk engine for full fidelity risk determination. The approach enables the CIAM service and/or risk engine to actually run at the edge, providing the best of both operations. Further, user recognition as described lowers bot detection false negatives. The better the UR (user recognition) models get, the more distinct each user will appear, making it increasingly difficult for a bot developer to chance upon the right combinations of user characteristics when trying to compromise user credentials. With the power of user recognition, even if a bot can evade standard bot detections and present the correct credentials, user recognition detects the imposter, blocks access, and provides the bot detection system with a false negative feedback loop it can use to improve its own algorithms. The approach also is advantageous as it enables application of risk-based authentication to social login. In particular, user recognition can add a layer of security on top of social login. Whereas traditional authentication services are focused on their users and stepping up their authentication, the above-described CIAM service can combine user recognition's determination of the true user score independently of whether the user authenticates against the CDN directory or not. This further provides a unique way to strengthen the level of assurance on social identities. It also opens up new opportunities for leveraging social identifiers within Financial Services Institutions and other higher security environments.

Although described and depicted in the above example scenarios, the techniques herein do not depend on a CIAM system, or even implementation within or in association with a CIAM system. The true user score is useful for any edge driven policy decision, a CIAM policy decision, or an origin policy decision. Further, the true user score can be calculated for requests for resources other than in association with a login by the endpoint. Other implementations may leverage the score via an application's session ID, via an identifier in an OpenID Connect or OAuth2 access token, or others.

Moreover, the notion of "recognition" as described above itself is not intended to be limited. By reversing the score (e.g., in a range of 0 to 100), it becomes a risk score (as opposed to a recognition score), with the highest value (e.g., 100) representing a riskiest value.

Figure 11:
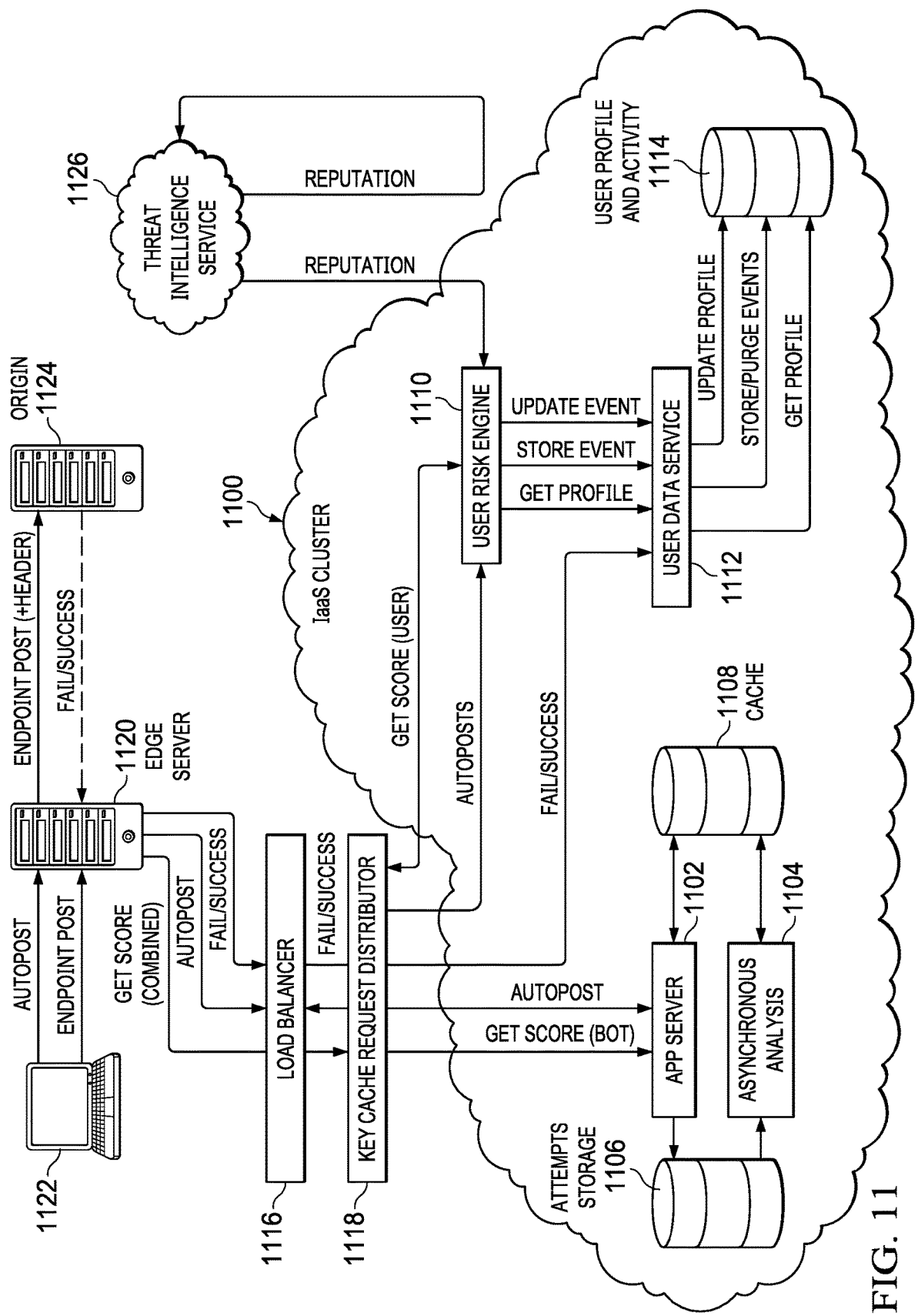
FIG. 11 depicts an alternative embodiment of an architecture solution that provides a bot management detection service in association with an account protection service.

Referring now to FIG. 11, another embodiment of the subject matter herein is depicted. In this embodiment, the solution is implemented in an Infrastructure-as-a-Service (IaaS)-based cluster 1100 having various components, and the approach implements (together with the bot detection) the notion of a "user risk" score. At a high level, the service calculates a user risk score and supporting evidence for customer application endpoints, makes policy driven decisions at the edge based on the score, and communicates the score and evidence to the customer in various forms for real-time and asynchronous fraud analysis and mitigation. This functionality is sometimes referred to herein as an account protection service to distinguish it from the bot detection service. Together, these services provide a fraud infrastructure.

For example, and in one exemplary implementation, the cluster 1100 supports a bot management system, e.g., Akamai® Bot Manager Premiere (BMP). As depicted in FIG. 11, the bot management system typically includes an application server 1102, which provides real-time bot detection services, and its associated asynchronous analysis 1104 functionality. The bot management system also includes various data stores, including an attempts data store 1106, and a cache 1108. As also depicted in FIG. 11, in this embodiment the cluster 1100 supports a user risk engine 1110, and a user data service 1112, which together with a user profile and activity data store 1114, implement the account protection techniques of this disclosure. Typically, the user risk engine executes in its own application server stack distinct from the application server stack used for bot detection and mitigation. The solution architecture also includes a load balancer component 1116, and a request distributor 1118 component. As also depicted, the solution cluster interoperates with the edge server 1120, which is positioned between the end user machine 1122, and a service customer's origin 1124. The service may also interoperate with other services such as a threat intelligence service 1126 (e.g., Akamai Cloud Security Intelligence (CSI) platform), and one or more other internal (to the CDN) systems (not shown). As will be described, the solution provides a highly available, highly reliable, and highly scalable solution to enable a service customer (running origin 1124) to fight against both automated and human fraud attacks related to account takeover (ATO) and new account fraud (NAF).

As used herein, ATO refers to an attack by which a malicious actor gains access to a victim's account at a web site or application. ATO is frequently accomplished via credential stuffing attacks whereby credentials from previous user database breaches are tried in an iterative fashion against one or more web sites. Successful ATO leads to a compromised account. As used herein, NAF an attack by which a malicious actor creates an account at a web site or application by claiming to be a person other than their true identity. These may be the result of identity theft, using a real person's identity to create a new account without their knowledge. This may also be a synthetic identity, e.g., created using a collection of attributes include name, address, phone number, and email address where the combination does not correlate to a real person. The purpose of NAF is typically to gain benefits of a new account, such as a free trial period, coupons, discounts, loyalty points, miles, and rewards. These benefits are then combined and resold to others who cash out by redeeming those points, miles, or rewards for items of value.

Referring back to FIG. 11, in this example implementation, the load balancer component 1116 provides for balancing requests to the infrastructure, and this component may be implemented used available components (e.g., HAProxy, a software load balancer, and Consul, a service networking solution). The request distributor 1118 preferably is implemented as a multi-node, multi-threaded, in-memory based data cache (e.g., Redis), and that also incorporates firewall and TLS support. The user risk engine 1110 is the component used to calculate a user risk score for each protected endpoint request, e.g., based on per request data, a true user profile, and zero or more other risk factors. The user data service 1112 is the component used to manage user profiles and user activity history. The user data service acts to separate from the user risk engine how and where the user profile and user activity history is maintained by the service. The end user machine 1122 desires access to a protected endpoint, which is sometimes referred to as a protected API resource. The origin exposes one or more such endpoints. The end user machine makes a request to access the endpoint at the origin as proxied by the edge. An endpoint, as identified by URL and parameter patterns, is a resource that is defined in a security policy to get both BMP and the protection afforded by the techniques of this disclosure. As also depicted in FIG. 11, the edge server delivers requests into the infrastructure, typically in the form of autoposts, wherein an autopost is an asynchronous POST sent by some script (e.g., a BMP JavaScript) containing client attributes and other data used by the service, e.g., for bot detection. As further shown, according to this embodiment, the edge server also makes requests to the infrastructure for a GTS, which refers to a "get threat score." This is a request made at the edge and used to get bot and user risk scores when needed by a security policy.

In runtime operation, autoposts (typically augmented with edge data) are consumed by the service's backend components in the cluster 1100. The request distributor layer makes autoposts and get_threat_score (GTS) requests available to app server stacks (bot manager app server 1102 and the user risk engine 1110), and composes responses. In operation, the edge server requests a user risk score, typically along with a bot score from the bot manager service. In general, the user risk engine 1110 leverages the autopost data, reputation data from the threat intelligence service, and the True User Profile (TUP), to generate a score and respond to the edge server. The edge applies policy, takes any needed mitigating actions, and, if allowed, forwards the login request to the origin. The edge may optionally inject the user risk score, true user factors and risk factors into a header forwarded to origin. Finally, the login status is reported to the service backend where it is preferably combined with autopost data to update the user profile and activity history.

The load balancer 1116 exposes new endpoints and routes traffic to new app server clusters, managing traffic with health monitoring autoscaling support. In addition, the autoscaling request distributor 1118 streams pub/sub deployment enables the application servers of both the bot manager and user risk protection to receive requests from the load balancer. The user risk engine and the user data service are shown as separate services to reflect their independent functions, and their potentially different computational needs, but this is not a requirement. As also depicted, the user profile and activity data store provides storage services for several classes of data: autoposts, scores associated with protected endpoint requests and their associated autoposts, user activity history, and user profiles.

In this embodiment, the user risk service preferably leverages and extends upon the bot manager service's approach to collecting data from clients and the edge, as well as sending requests to the fraud detection infrastructure. To this end, preferably the service (user risk engine and user data service) utilizes the bot manager collection approach such that the client side data being examined comes from the same autoposts used for bot detection. That said, it is not required that a protected endpoint leverage both the bot detection and the user risk detection service. In addition, there may be situations wherein the user risk service still needs to score client requests even when the bot manager has already decided whether the client is or is not a bot.

Preferably, the bot manager system's autoposts contain client side data and are augmented by data at the edge before being forwarded to the user risk engine/user data service that constitute the account protection infrastructure. As noted, the account protection service preferably uses data in autoposts to represent user recognition data, the information related to the current request used for comparison with the TUP when calculating the user risk score. In addition, preferably data from the autoposts is also incorporated into the true user profile depending on the generated risk score, detected login status, and other inputs as determined, for example, by the threat intelligence service. Preferably, the edge contains and calculates data to augment requests sent to the account protection infrastructure. This data may include data such as country, state, and ASN, TLS and TCP fingerprint data. In this embodiment, the bot manager service also uses several cookies, e.g., a short term cookie, and a long term cookie. Each of these cookies preferably have their own unique identifier that the bot detection service uses to correlate autoposts and protected endpoint requests and aggregate data used in determining whether a client is a bot or not. In addition, a stop protocol preferably is encoded into the long term cookie, directing the JavaScript when to stop sending more autoposts. Typically, the bot manager application server tells clients to stop sending telemetry once it has determined the client is human and restarts telemetry (reset flag) for humans after some number of protected endpoint requests to re-validate the human status. The account protection service leverages these unique identifiers to correlate autoposts with protected endpoint requests so that it does not unnecessarily recalculate scores for multiple autoposts on a single page in quick succession, and to look up the true user profile against which to calculate a score using an autopost.

Figure 12A:
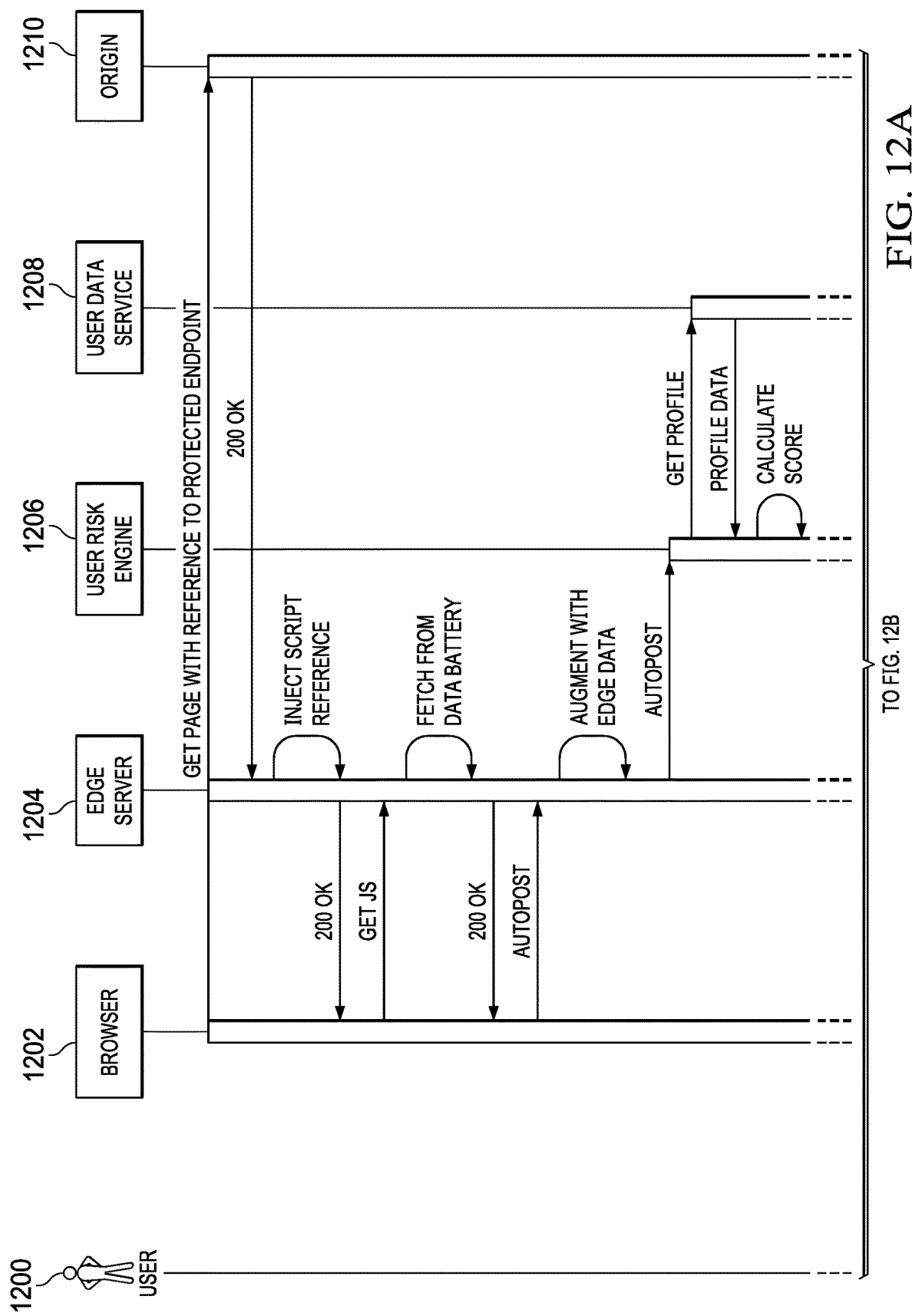
FIGS. 12A and 12B together depict a sequence diagram depicting interactions between the components of FIG. 11 during a user login against a protected endpoint.
Figure 12B:
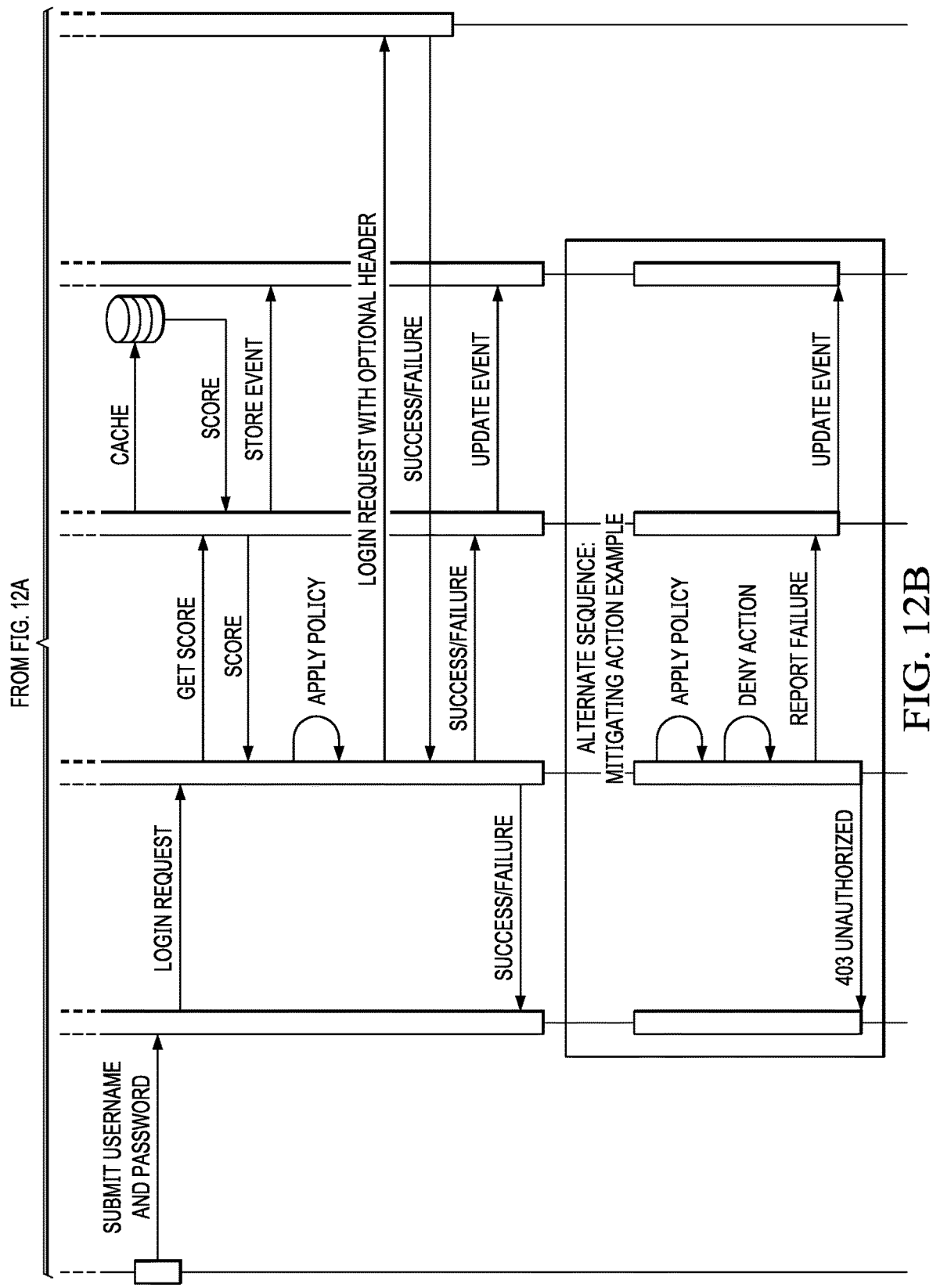

The account protection service calculates (preferably in real-time) a user risk score based on data collected at the client and the edge, reputation data, and historical data (true user profile) specific to that user. FIGS. 12A and 12B together are a representative sequence diagram detailing interactions between major components during a user login against a protected endpoint. In this example, the client 1200 operates a browser 1202, and interacts with an edge server 1204. The backend components of the account protection service comprise user risk engine 1206, and user data service 1208. The service customer origin 1210 also is depicted. In operation, after the browser requests a page from the origin and the origin returns a HTTP 200, the edge server injects a script reference and returns the page (with the reference) to the browser. The browser requests the script, and the edge server fetches it from local CDN data store. The script is served and then executed in the client. The script running inside the browser makes an autopost back to the edge server with the collected data/telemetry. The edge server then augments the autopost with edge data and forwards the information to the user risk engine. User risk engine uses the information to fetch a user profile from the user data service. The profile data is returned to the user risk engine, which then calculates the user risk score. The score is cached. Upon a subsequent login request (in this example scenario following the end user's submission of his/her credential) the edge server makes a request to the user risk engine to get the score. The score is returned to the edge server from the user risk engine, and the edge server then applies a policy based on the score. If the score passes, the login request is forwarded from the edge server to the origin, and the success/failure response is then received at the edge server and passed through to the browser for action. The outcome is also returned back to the user risk engine, which updates the user data service with the result. This ends the processing. As also depicted, when (based on the score) the policy requirement is not met, the edge server denies the login request, returns an appropriate response to the client (e.g., an HTTP 403 Unauthorized), and reports the failure to the user risk engine. The user risk engine updates the user data service appropriately.

Although not intended to be limiting, typically the user risk engine and the user data service operate on streams of data or events. An event is a message emitted by the edge as a result of a protected request. As has been described, preferably an autopost reception (at the edge server) drives the generation of a risk score. A login status event (or time elapsed), or some other configurable activity, drives an update of a user profile. The user data service may preprocess existing profile data before making it available to the risk engine. As noted, preferably the user risk engine performs several main operations, namely, generating the user risk score based on telemetry received asynchronously via autoposts, or received synchronously vis inline telemetry in a protected endpoint request, and returning a user risk score to the edge for a protected endpoint request. The process of generating a user risk score may be based on an algorithm that may involve one or more stages. For example, in one example, the risk engine may fetch an unprocessed autopost from the cache, enhance and transform the autopost to meet any algorithm requirements, retrieve the customer's IP and network reputation data, calculate the reputational risk, retrieve the true user profile, identify elements of change, calculate the weights of profile elements, calculate the profile risk, retrieve the bot score as available, and compose a set of one or more interim values into the user risk score, potentially with true user and risk factors. As described, a protected endpoint's request for the current user risk score is received by the user risk engine, preferably via the GTS API request, which may also be published to a request distributor stream. In one example implementation, the request distributor layer is an autoscaling, pub/sub deployment using Redis streams to support multiple consumers of the request (namely, the bot manager service, and the account protection service), together with a key/value pair to read the response from those consumers and that it sends back to the edge. In this approach, the bot manager application and the user risk engine represent separate consumer groups that subscribe to the autopost and GTS topics. The request distributor may be implemented using other request/response handling mechanisms.

As noted above, a protected endpoint's request for the current user risk score is received by the user risk engine via the GTS API request also published to a request distributor stream. Any previously computed score is retrieved from a cache, or the score may be calculated on-demand. For mobile app requests that rely on inline (synchronous) telemetry, or where the score is still being calculated when the GTS API call arrives, the score retrieval process has to wait a configurable amount of time before returning, with or without a score. Thus, preferably the algorithm supports the notion of partial scoring so that the risk engine can still return a score, perhaps of lower accuracy or confidence, if some configurable time budget is exhausted.

The user data service preferably exposes APIs to get a user's profile, and delete a user profile. It also handles updating user profiles. Without being limiting, preferably updating user profiles and generating user risk scores rely on client reputation data provided by the threat intelligence service. The user data service is responsible for asynchronously retrieving reputation data via the API, parsing and loading the data into memory, and making the data available for lookup by a profile update process and externally by the user risk engine.

A representative user profile comprises: profile version, internal identifier, external UUID, account ID, date user first seen, most relevant event in profile, allow list status, last allow list status change data, and allow list status changed by (userid). Typically, the request for the profile comes from the user risk engine.

User risk scores in this embodiment are calculated upon autopost reception. Along with trust and risk factors, these scores are stored pending a request for the user risk score. In some cases, calculation is completed prior to the reception of the request for the user risk score; in others, however, the score is obtained from some storage location. The data stored typically includes a number of data items in addition to the score (between 0-100) itself: external UUID, account ID, event ID or timestamp, both short and long-term cookie identifiers, trust factors and their scores, risk factors and their scores, and additional status messages or codes to represent no profile found, insufficient profiling for scoring, etc.

User activity history contains data such as the following types: external UUID, timestamp, edge server request ID, account ID, security configuration ID, resource purpose type, resource purpose ID, attributes from the autopost used in the score calculation, risk score, scoring status, trust and risk factors, URL, login status and status code, device ID, device OS and version, and device browser type and version.

The true user profile is a representation of user attributes that are expected to be seen when a user makes a protected endpoint request. The TUP typically is used by the user data service, as noted above. The data in the profile typically includes: internal UUID, external UUID, account ID, set of long and short term cookie identifiers for this user and the timestamps for when they were most recently seen on login, profile creation date, last update date, other metadata as determined by algorithm requirements (e.g., number of events), and events and their attributes, preferably stored and organized dependent on any algorithm requirements. As has been described, the TUP retrieval typically occurs upon a protected endpoint's request for the current user score.

Generalizing, one preferred approach herein provides an account protection service that relies upon previous user activity to construct a true user profile, including based on locations, networks, devices and activity time. In one embodiment, a statistical model based on the true user profile and other risk factors, gathered over time and updated regularly, is used to assess the risk of a user during an authentication process (or otherwise). A service customer uses the risk to remove unnecessary friction and to reduce incidences of automated and human account takeover attacks. Using SIEM integration or header injections, a service customer can even augment its own internal systems with information about user risk score, combined with risk and true factors, to take a final decision on-premises.

Other Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted in FIGS. 1-2, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Machine learning may be used to augment or to facilitate the building of the user recognition/user risk models as described herein.

What we claim is as follows:

1. A method of account protection, comprising:
at a first server:
responsive to receipt of a request associated with a client access to a resource, injecting a script and returning the resource to the client;
responsive to receipt of an automated post from the client, the automated post including data collected as a result of the script being executed, forwarding the automated post to an account protection service;
at a second server distinct from the first server and that executes the account protection service:
responsive to receiving the automated post, issuing a request for a user profile, the user profile having been computed from information derived from one or more prior successful logins by the client;
responsive to receipt of the user profile, calculating a user score;
returning the user score to the first server;
at the first server:
responsive to receipt of the user score, applying a policy to the user score, and
taking an action based on whether the user score satisfies the policy.

2. The method as described in claim 1 wherein the user score represents a degree to which a current login matches a model of a successful login, wherein the model is derived from the information derived from the one or more prior successful logins.

3. The method as described in claim 2 further including updating the model based as additional successful logins occur.

4. The method as described in claim 1 wherein the data collected as a result of executing the script includes one of: device- and user agent-specific attributes for user recognition.

5. The method as described in claim 1 wherein the first server also augments the automated post with edge data prior to forwarding the automated post to the second server.

6. The method as described in claim 5 wherein the edge data comprising information specific to the request and that differs between or among at least one of: users, user agents and devices.

7. The method as described in claim 5 wherein the information is one of: a geolocation of the endpoint, a user-agent header, and a TLS fingerprint.

8. The method as described in claim 1 wherein a user profile includes an indication of whether sufficient data has been collected for the user profile to be considered for use in generating the user score.

9. The method as described in claim 1 wherein the user score is augmented to included information representing which parts of a set of user recognition data aligned with the user profile.

10. The method as described in claim 1 wherein the user score is returned to the first server upon receipt at the first server of a login request to a protected endpoint.

11. The method as described in claim 10 wherein the login request is associated with a hosted login to the protected endpoint, the hosted login provided by an identity and access mechanism.

12. The method as described in claim 1 wherein the automated post is associated with collection of data useful for detecting whether the client is a bot.

13. The method as described in claim 1 wherein the user score is also computed based on additional risk data.

14. The method as described in claim 13 wherein the additional risk data is client reputation data.

15. The method as described in claim 1 wherein the account protection service protects against an account takeover (ATO) attack by which a malicious actor associated with the client gains access to an account at a web site or application.

16. The method as described in claim 1 wherein the account protection service protects against a new account fraud (NAF) by which a malicious actor associated with the client creates an account a web site or application by claiming to be a person other than his or her true identity.

17. The method as described in claim 1 wherein the action includes providing an access token to the endpoint.

18. The method as described in claim 1 wherein the action includes forwarding a login request to a customer origin.

19. Apparatus, comprising:
a set of hardware processors;
computer memory associated with the set of hardware processors and holding computer program code configured as a first server, and a second server, the program code configured:
at the first server:
responsive to receipt of a request associated with a client access to a resource, injecting a script and returning the resource to the client;
responsive to receipt of an automated post from the client, the automated post including data collected as a result of the script being executed, forwarding the automated post to an account protection service;
at the second server and that executes the account protection service:
responsive to receiving the automated post, issuing a request for a user profile, the user profile having been computed from information derived from one or more prior successful logins by the client;
responsive to receipt of the user profile, calculating a user score;
returning the user score to the first server;
at the first server:
responsive to receipt of the user score, applying a policy to the user score, and
taking an action based on whether the user score satisfies the policy.

20. The apparatus as described in claim 19 wherein the account protection service protects against one of: an account takeover (ATO) attack by which a malicious actor associated with the client gains access to an account at a web site or application, and a new account fraud (NAF) by which a malicious actor associated with the client creates an account a web site or application by claiming to be a person other than his or her true identity.

* * * * *